United States Patent
Ono

(10) Patent No.: US 10,754,920 B2
(45) Date of Patent: Aug. 25, 2020

(54) ARITHMETIC PROCESSING DEVICE

(71) Applicant: KABUSHIKI KAISHA TOSHIBA, Minato-ku (JP)

(72) Inventor: Mizuki Ono, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 81 days.

(21) Appl. No.: 16/126,006

(22) Filed: Sep. 10, 2018

(65) Prior Publication Data

US 2019/0286685 A1    Sep. 19, 2019

(30) Foreign Application Priority Data

Mar. 19, 2018    (JP) .................................. 2018-051544

(51) Int. Cl.
*G06F 17/15*    (2006.01)

(52) U.S. Cl.
CPC .................................... *G06F 17/15* (2013.01)

(58) Field of Classification Search
CPC ........ G06N 3/04; G06N 3/0454; G06N 3/063; G06F 3/06; G06F 3/0602; G06F 3/061–0613; G06F 3/0625; G06F 3/0626; G06F 3/0629–0635; G06F 3/0638; G06F 3/064; G06F 3/0643; G06F 3/0644; G06F 3/0646; G06F 3/0655; G06F 17/10; G06F 17/15; G06F 17/153; G06F 17/16
(Continued)

(56) References Cited

U.S. PATENT DOCUMENTS 10,366,328 B2 * 7/2019 Yang ........................ G06N 3/08
2015/0309961 A1    10/2015 Ozaki et al.
(Continued)

FOREIGN PATENT DOCUMENTS

JP    2015-210709    11/2015
JP    2017-138867    8/2017
(Continued)

OTHER PUBLICATIONS

CSCA0101 Computing Basics, Storage Devices, Chapter 5, found at http://www.ftms.edu.my/images/Document/CSCA0101%20-%20Computing%20Basics/csca0101_ch05.pdf, 2007 (Year: 2007).*

*Primary Examiner* — Andrew Caldwell
*Assistant Examiner* — Emily E Larocque
(74) *Attorney, Agent, or Firm* — Oblon, McClelland, Maier & Neustadt, L.L.P.

(57) ABSTRACT

An arithmetic processing device according to the present embodiment includes: a first storage device including m (m≥2) groups each including at least one first array; a second storage device including n (m>n≥1) groups each including at least one second array; a third storage device including at least one third array; a fourth storage device including k (m>k≥1) fourth arrays; and a processor, the processor selecting n groups of the first array from among the m groups of the first array, reading out data stored in memory elements of the first array included in the selected groups, storing the data in the memory elements of the second array of the second storage device, and the processor performing a convolution process to the third array using the data stored in the memory elements of the second array and storing a result of the convolution process in the fourth arrays.

10 Claims, 24 Drawing Sheets

(58) Field of Classification Search
USPC .................................................. 708/420, 422
See application file for complete search history.

(56) References Cited

U.S. PATENT DOCUMENTS

| | | |
|---|---|---|
| 2017/0228634 A1 | 8/2017 | Tomita |
| 2018/0032835 A1 | 2/2018 | Shirahata |
| 2018/0246669 A1* | 8/2018 | Redfern ................. G06F 3/0613 |
| 2019/0095130 A1* | 3/2019 | Xu ......................... G06F 3/0656 |
| 2019/0156188 A1 | 5/2019 | Ono et al. |
| 2019/0180170 A1* | 6/2019 | Huang .................. G06N 3/0445 |

FOREIGN PATENT DOCUMENTS

| | | |
|---|---|---|
| JP | 2018-018350 | 2/2018 |
| JP | 2019-95862 A | 6/2019 |

* cited by examiner

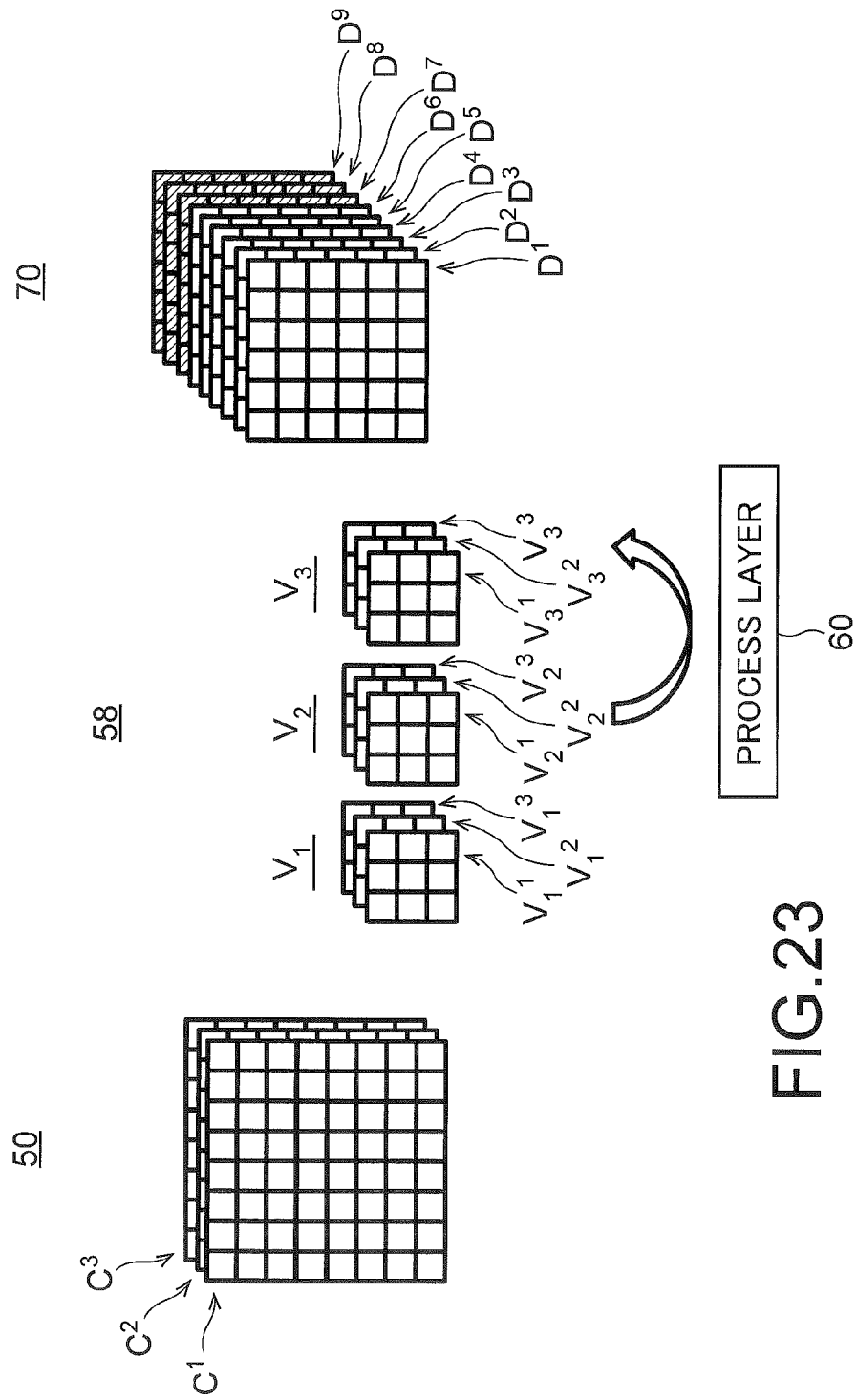

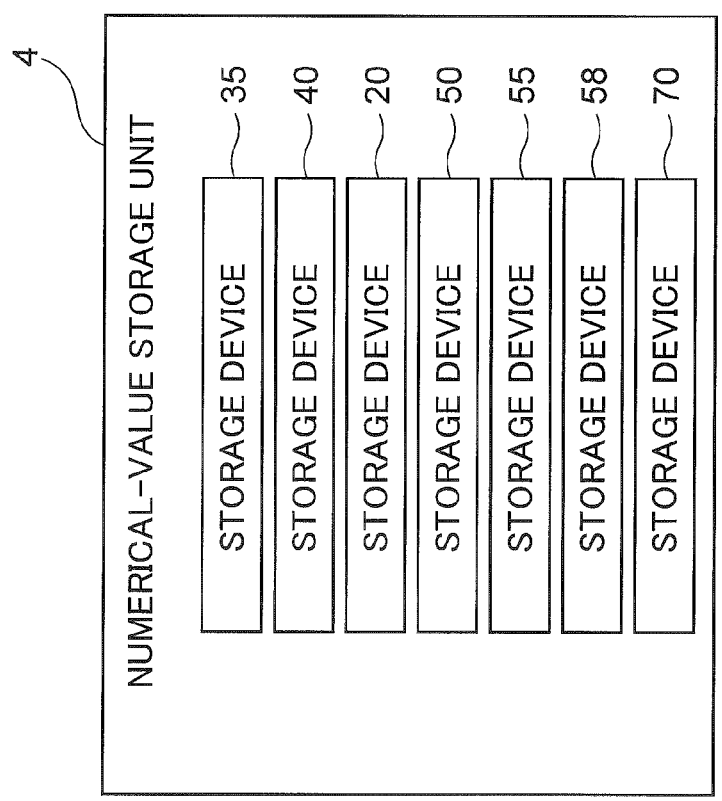

ARITHMETIC PROCESSING DEVICE

CROSS REFERENCE TO RELATED APPLICATIONS

This application is based upon and claims the benefit of priority from the prior Japanese Patent Application No. 2018-051544, filed on Mar. 19, 2018, the entire contents of which are incorporated herein by reference.

FIELD

Embodiments described herein relate generally to an arithmetic processing device.

BACKGROUND

A conventional arithmetic processing device, which realizes a convolutional neural network including a plurality of process layers, includes a storage device for each process layer to store the entire output of the process layer, to perform every process of the process layer and store the output of every process in the storage device, and perform the process of the succeeding layer using the stored numerical values. The storage device has at least one arrangement of numerical values arranged in a row direction and a column direction. When there is a plurality of arrangements, the arrangements are arranged in a direction intersecting with a plane including a row direction and a column direction. The direction with which the plane intersects is referred to as a depth direction.

As a process to be performed by a process layer, there is, for example, a convolution process which is a process of obtaining the sum of products of corresponding numerical values between an arrangement of specific numerical values, which is referred to as a kernel, and an arrangement of numerical values having the same depth as the kernel. Each numerical value of the kernel is referred to as a weight. The process of obtaining the sum of products may be followed by a process of adding a specific numerical value, which is referred to as a bias, to the value of the sum of products.

An activation function process may further be performed to the result of the process of obtaining the sum of products or the result of the process of adding the bias. The activation function process is defined as a process of assigning a specific function value to a specific numerical value, for example, assigning a value of tan h (x) to a numerical value x. Another example is a Rectified Linear Unit process of assigning the value x or zero, either one of a larger one, to the numerical value x.

The convolution process may be followed by a pooling process which is a process of appointing one numerical value to represent a group of specific numerical values. As a method of this process, there are a method of extracting a maximum value of the specific numerical values, a method of calculating an arithmetic mean of the specific numerical values, etc. The depth of a kernel in the convolution process is generally the depth of the arrangement of numerical values to be subjected to the convolution process. The depth of a group of specific numerical values in the pooling process is 1 in general.

As described above, the conventional arithmetic processing device has a storage device for each process layer to store the entire output of the process layer, to perform every process of the process layer and store the output of every process in the storage device, and perform the process of the succeeding layer using the stored numerical values. Therefore, it is required to have a storage device for each process layer to store the entire output of the process layer, which requires a large circuit area, and as a result, causes increase in production cost.

BRIEF DESCRIPTION OF THE DRAWINGS

FIG. 23 is a diagram explaining a convolution process of the process layer in the third embodiment.

FIG. 24 is a diagram showing a numerical-value storage unit.

DETAILED DESCRIPTION

Figure 1:
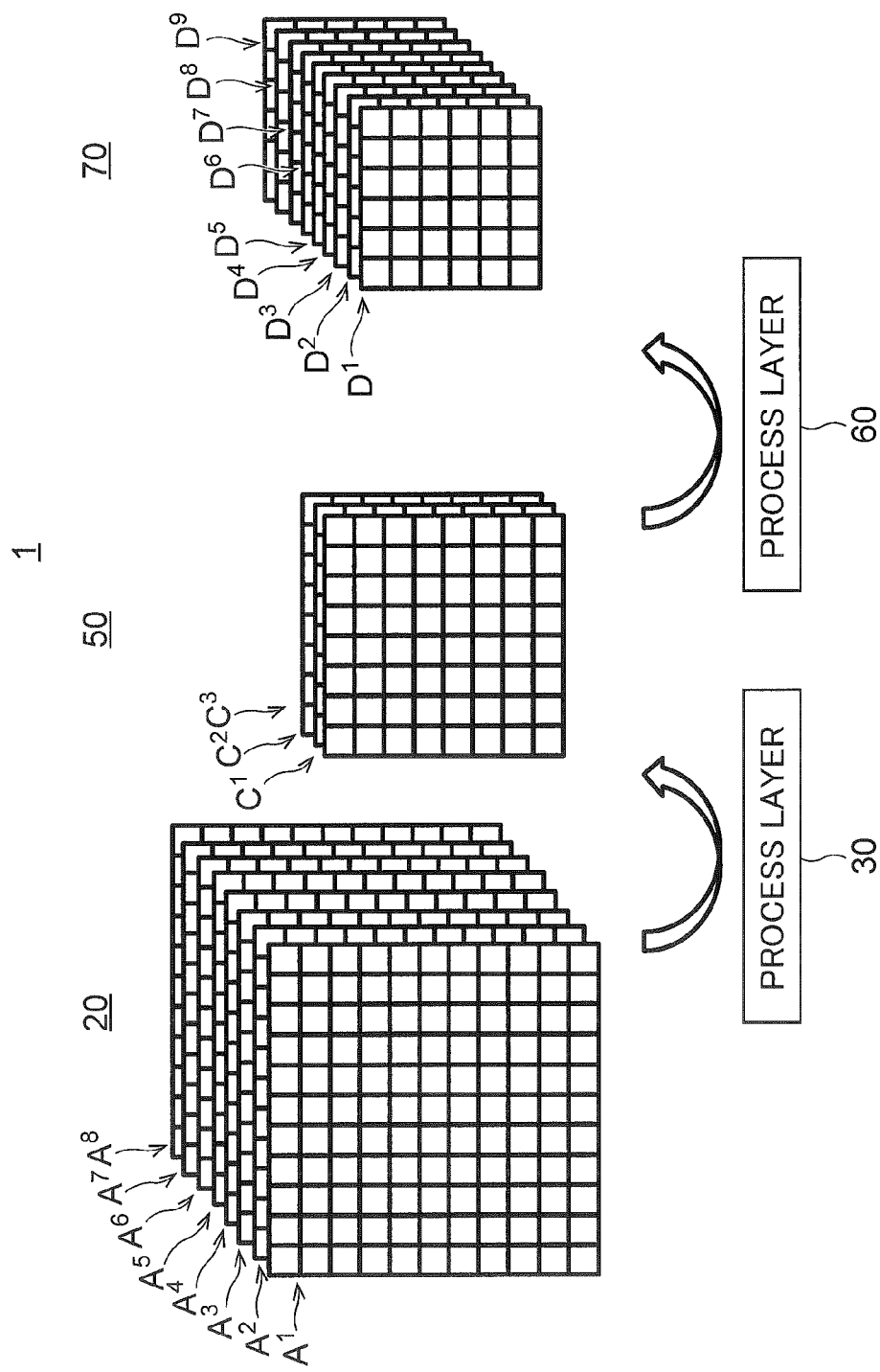
FIG. 1 is a diagram explaining the outline of an arithmetic processing device according to a first embodiment.

An arithmetic processing device according to the present embodiment includes: a first storage device including m (m≥2) groups each including at least one first array having memory elements arranged in a first direction and a second direction intersecting with the first direction; a second storage device including n (m>n≥1) groups each including at least one second array having memory elements arranged in the first and second directions; a third storage device including at least one third array having memory elements arranged in the first and second directions; a fourth storage device including k (m>k≥1) fourth arrays each having memory elements arranged in the first and second directions; and a processor, the processor being configured to select n groups of the first array from among the m groups of the first array of the first storage device, to read out data stored in the memory elements of the first array included in the selected groups, to store the data in the memory elements of the second array of the second storage device, and the processor being configured to perform a convolution process to the third array of the third storage device using the data stored in the memory elements of the second array of the second storage device and to store a result of the convolution process in the fourth arrays of the fourth storage device.

Embodiments will now be explained with reference to the accompanying drawings. Although the numerical values shown in the drawings are arranged in a specific way of arrangement for explanation, how the numerical values are arranged is not important, they may be arranged in another way of arrangement. The present invention is not limited to the following embodiments, which can be used in a variety of modifications.

The following embodiments will be explained with an example in which there are two process layers. However, even if there are three or more process layers, the following embodiments are applicable to successive two process layers.

First Embodiment

An arithmetic processing device according to a first embodiment will be explained with reference to FIGS. 1 to 7. The arithmetic processing device of the first embodiment realizes a convolutional neural network including a plurality of process layers, the outline thereof being shown in FIG. 1. The arithmetic processing device 1 includes a process layer 30 and a process layer 60. The process layer 30 performs a convolution process to data stored in a storage device 20 and stores a result of process in a storage device 50. The process layer 60 performs a convolution process to the data stored in the storage device 50 and stores a result of process in a storage device 70.

As shown in FIG. 1, the storage device 20 has eight arrays $A^1$ to $A^8$, each array $A^i$ (i=1, ..., 8) having elements (memory elements) of eleven rows and eleven columns. An element of a j-th (j=1, ..., 11) row and a k-th (k=1, ..., 11) column in each array $A^i$ (i=1, ..., 8) is expressed as $A^i$ (j, k). In the present specification, the element $A^i$ (j, k) (i=1, ..., 8, j, k=1, ..., 11) also expresses data to be stored in this element. The data to be stored in the element $A^i$ (j, k) (i=1, ..., 8, j, k=1, ..., 11) is read out from an external storage device 200 by a reader 2 in the arithmetic processing device 1 shown in FIG. 3 and stored in the storage device 20 included in a numerical-value storage unit 4. The storage device 50 and the storage device 70 are also included in the numerical-value storage unit 4. Storage devices 35, 40, 55, and 58 that are described later are also included in the numerical-value storage unit 4 as shown in FIG. 24.

As shown in FIG. 1, the storage device 50 has three arrays $C^1$ to $C^3$, each array $C^i$ (i=1, 2, 3) having elements (memory elements) of eight rows and eight columns. An element of a j-th (j=1, ..., 8) row and a k-th (k=1, ..., 8) column in each array $C^i$ (i=1, 2, 3) is expressed as $C^i$ (j, k). In the present specification, the element $C^i$ (j, k) (i=1, 2, 3, j, k=1, ..., 8) also expresses data to be stored in this element.

As shown in FIG. 1, the storage device 70 has nine arrays $D^1$ to $D^9$, each array $D^i$ (i=1, ..., 9) having elements (memory elements) of six rows and six columns. An element of a j-th (j=1, ..., 6) row and a k-th (k=1, ..., 6) column in each array $D^i$ (i=1, ..., 9) is expressed as $D^i$ (j, k). In the present specification, the element $D^i$ (j, k) (i=1, ..., 9, j, k=1, ..., 6) also expresses data to be stored in this element.

(First Process of Process Layer 30)

Subsequently, a process (first process) that is a part of a convolution process in the process layer 30 will be explained with reference to FIGS. 2 to 7. This convolution process uses three kernels $W_1$ to $W_3$ shown in FIG. 2. The kernels $W_1$ to $W_3$ each have eight arrays each having elements arranged in four rows and four columns. For example, the kernel $W_1$ has eight arrays $W_1^1$ to $W_1^8$, each array $W_1^i$ (i=1, ..., 8) having elements (memory elements) arranged in four rows and four columns. An element disposed in a j-th (j=1, ..., 4) row and a k-th (k=1, ..., 4) column in each array $W_1^i$ (i=1, ..., 8) is expressed as $W_1^i$ (j, k). The element $W_1^i$ (j, k) (j, k=1, ..., 4) also expresses data (also referred as weight) to be stored in this element. The same way of expression explained above is also applied to the other kernels $W_2$ and $W_3$.

The process layer 30 uses twelve kernels $E_1$ to $E_{12}$ for the convolution process. Kernels $E_j$ (j=1, ..., 12) each have eight arrays $E_j^1$ to $E_j^8$, each array $E_j^i$ (i=1, ..., 8) having elements (memory elements) arranged in four rows and four columns.

An element disposed in an m-th row and an n-th column in each array $E_j^i$ (i=1, ..., 8) is expressed as $E_j^i$ (m, n). The element $E_j^i$ (m, n) also expresses data to be stored in this element. Values obtained in advance and to be stored in the kernels $E_1$ to $E_{12}$ and bias values which will be explained later are read out from an external storage device 202 by the reader 2 shown in FIG. 3 and stored in a storage device 35 (refer to FIG. 4) located in the numerical-value storage unit 4. The number (number in the depth direction) of the arrays included in each of the kernels $E_1$ to $E_{12}$ is the same as the depth of input of the process layer 30, that is, the number of the arrays of the storage device 20. The number of the kernels $E_1$ to $E_{12}$ (=12) is the same as the depth of output of the process layer 30. A bias value to be used by the process layer 30 is defined as $B1^i$ (1≤i≤12).

Figure 2:
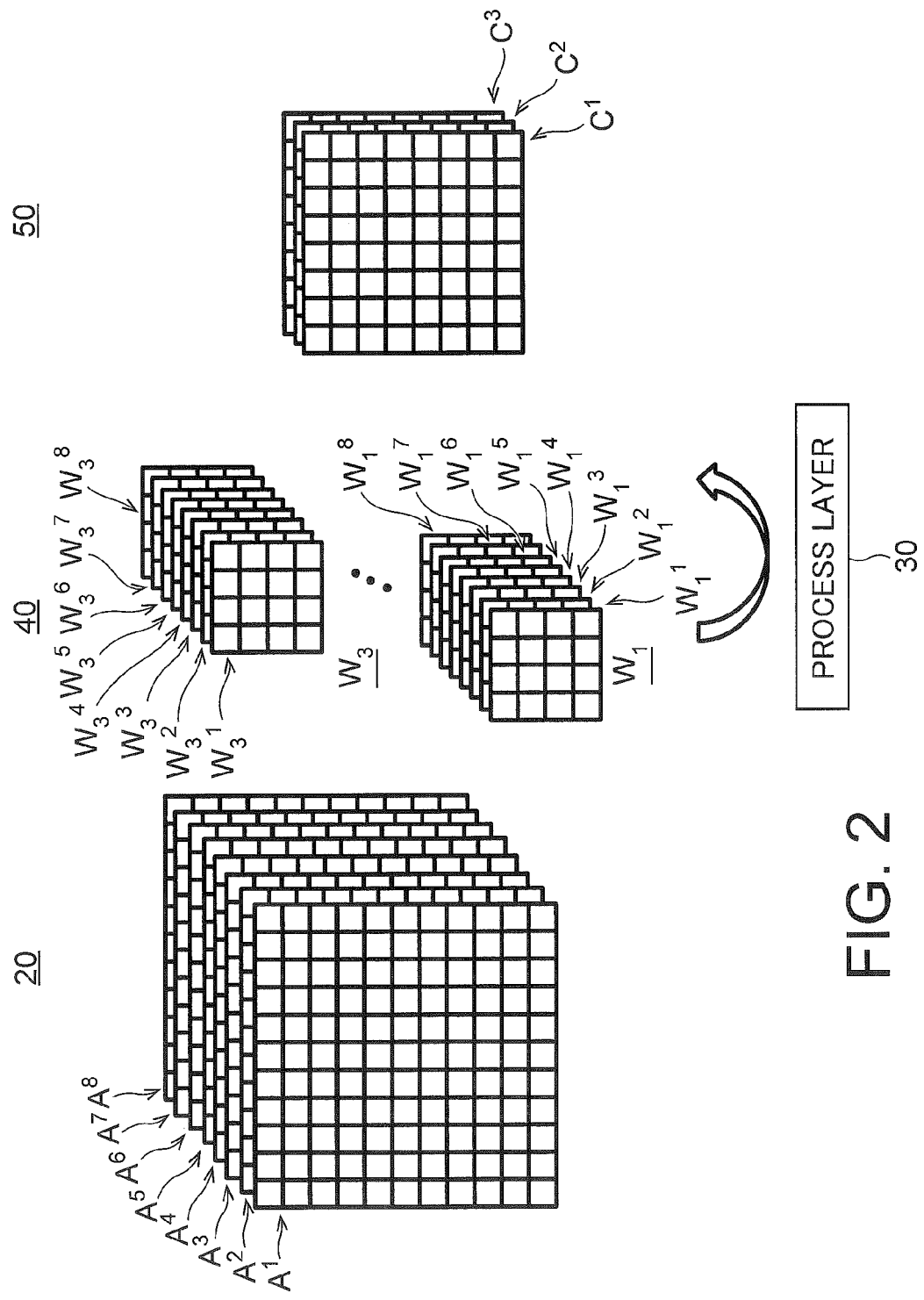
FIG. 2 is a diagram explaining a convolution process of a process layer in the first embodiment.
Figure 3:
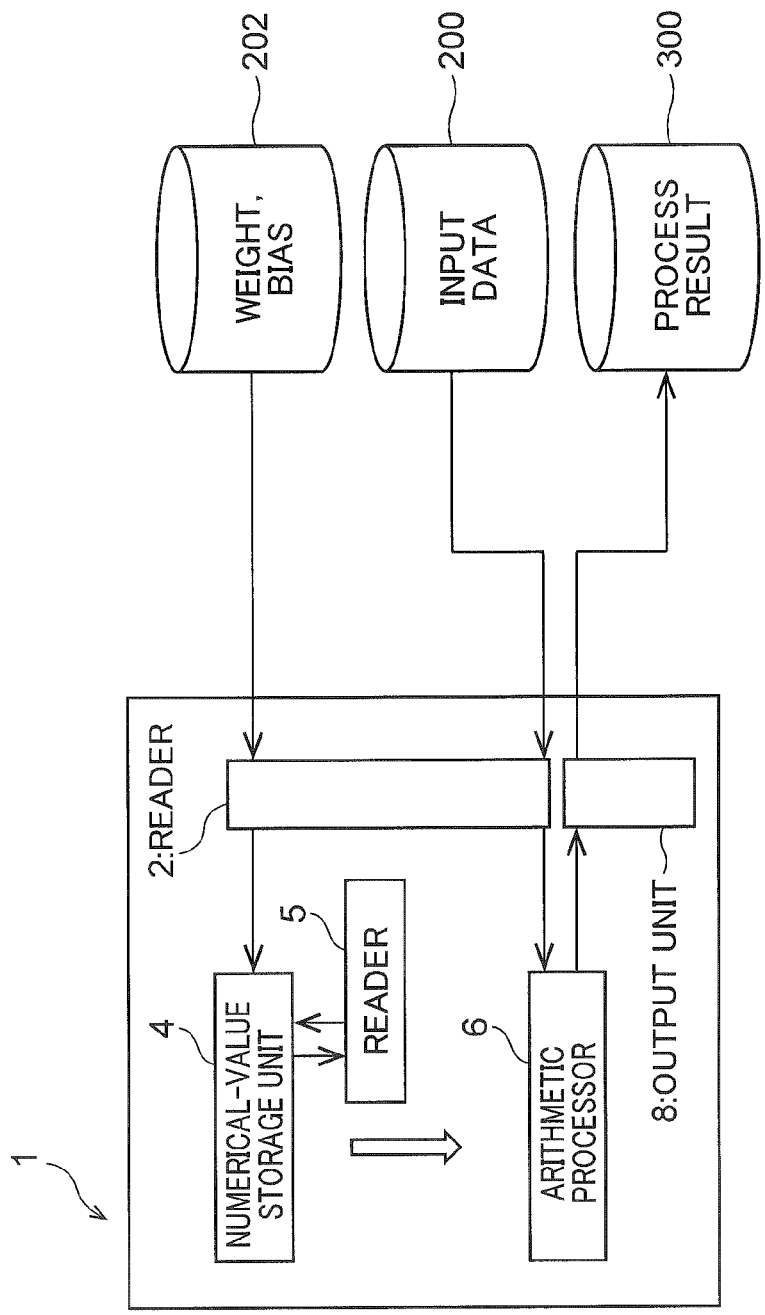
FIG. 3 is a diagram explaining the outline of the arithmetic processing device according to the first embodiment.
Figure 4:
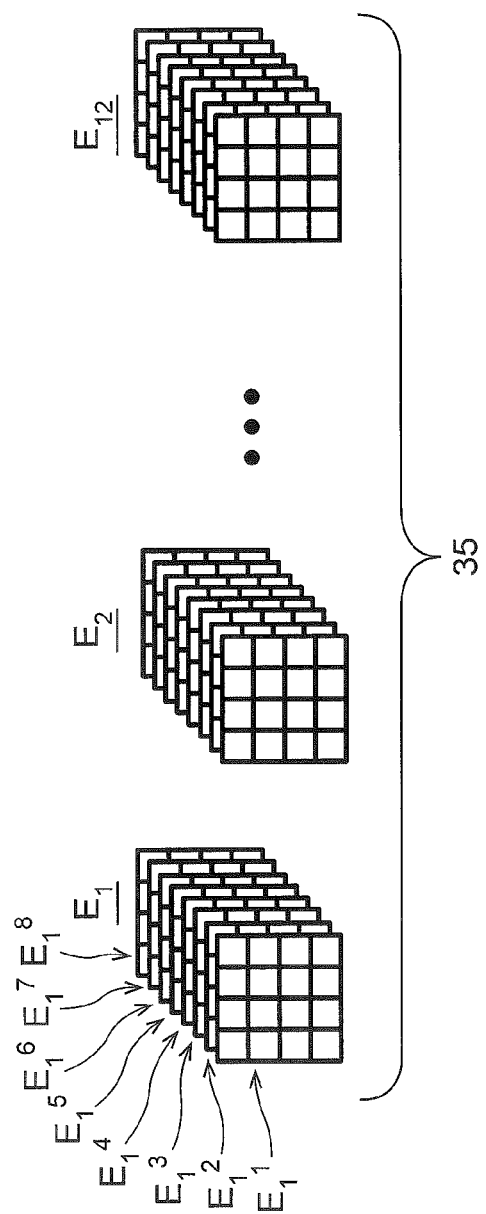
FIG. 4 is a diagram showing a storage device used in the first embodiment.

In the arithmetic processing device 1 of the present embodiment, a reader 5 shown in FIG. 3 reads out at least a part of the kernels $E_1$ to $E_{12}$, for example, data of the kernels $E_1$ to $E_3$, stored in the storage device 35 of the numerical-value storage unit 4 shown in FIG. 3, and stores the data, respectively, in the kernels $W_1$ to $W_3$ of a storage device 40 shown in FIG. 2.

Figure 5:
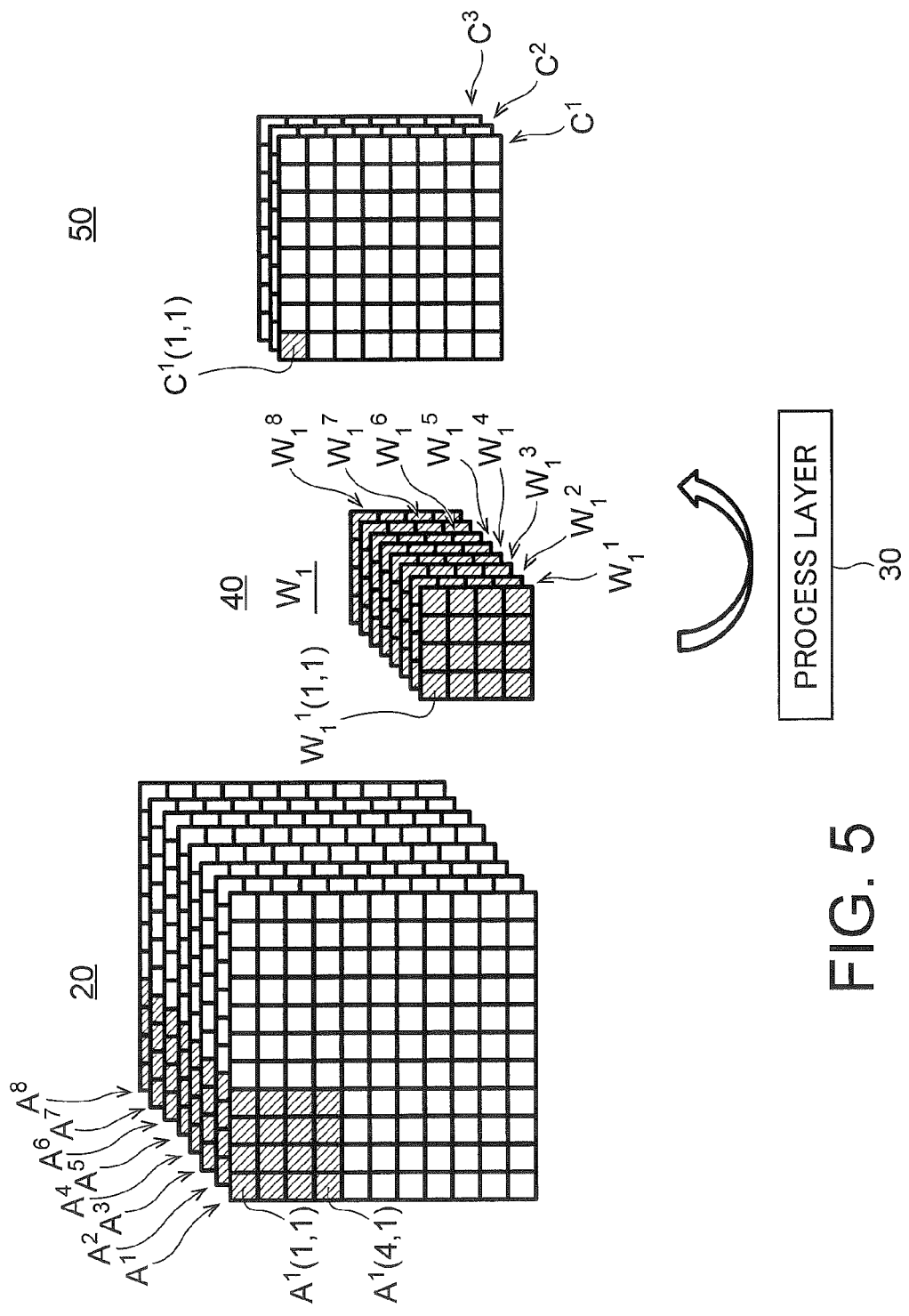
FIG. 5 is a diagram explaining a convolution process of a process layer in the first embodiment.

Subsequently, as shown in FIG. 5, the total sum of products of data $A^i$ (j, k) stored in the storage device 20 and data $W_1^i$ (j, k) stored in the storage device 40 is calculated with respect to i (1≤i≤8), j (1≤j≤4), and k (1≤k≤4). The total sum is expressed as $\Sigma\Sigma\Sigma$ ($A^i$ (j, k)×$W_1^i$ (j, k)). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The total sum is obtained by the arithmetic processor 6 shown in FIG. 3. In this process, the calculation of total sum with respect to i (i=1, ..., 8) can be performed in parallel, which is advantageous in achieving the shortening of process time, that is, high-speed operation. Then, a bias value $B1^1$ of the process layer 30 is added to the obtained total sum, with application of an activation function process as required, to obtain a value which is then stored in an element $C^1$ (1, 1) of the array $C^1$ of the storage device 50 shown in FIG. 1 (FIG. 5).

Figure 6:
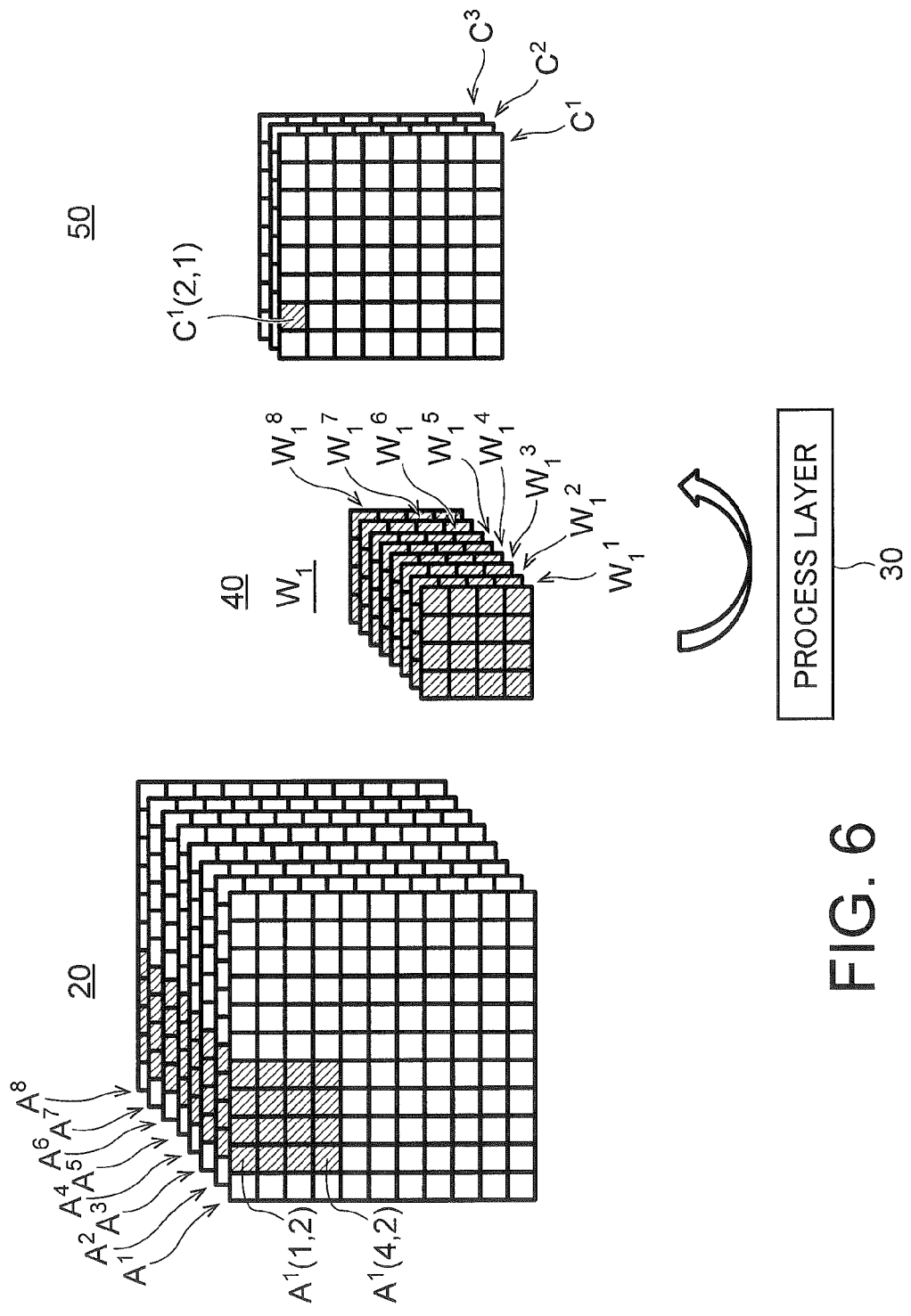
FIG. 6 is a diagram explaining a convolution process of the process layer in the first embodiment.

Subsequently, as shown in FIG. 6, the total sum of products of data $A^i$ (j, k+1) stored in the storage device 20 and the data $W_1^i$ (j, k) stored in the storage device 40 is calculated with respect to i (1≤i≤8), j (1≤j≤4), and k (1≤k≤4). The total sum is expressed as III ($A^i$ (j, k+1)×$W_1^i$ (j, k)). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The total sum is obtained by the arithmetic processor 6 shown in FIG. 3. In this process, the calculation of sum of products with respect to i (i=1, . . . , 8) can be performed in parallel, which is advantageous in achieving the shortening of process time, that is, high-speed operation. Then, the bias value $B1^1$ of the process layer 30 is added to the obtained total sum, with application of the activation function process as required, to obtain a value which is then stored in an element $C^1$ (1, 2) of the array $C^1$ of the storage device 50 shown in FIG. 1 (FIG. 6).

Figure 7:
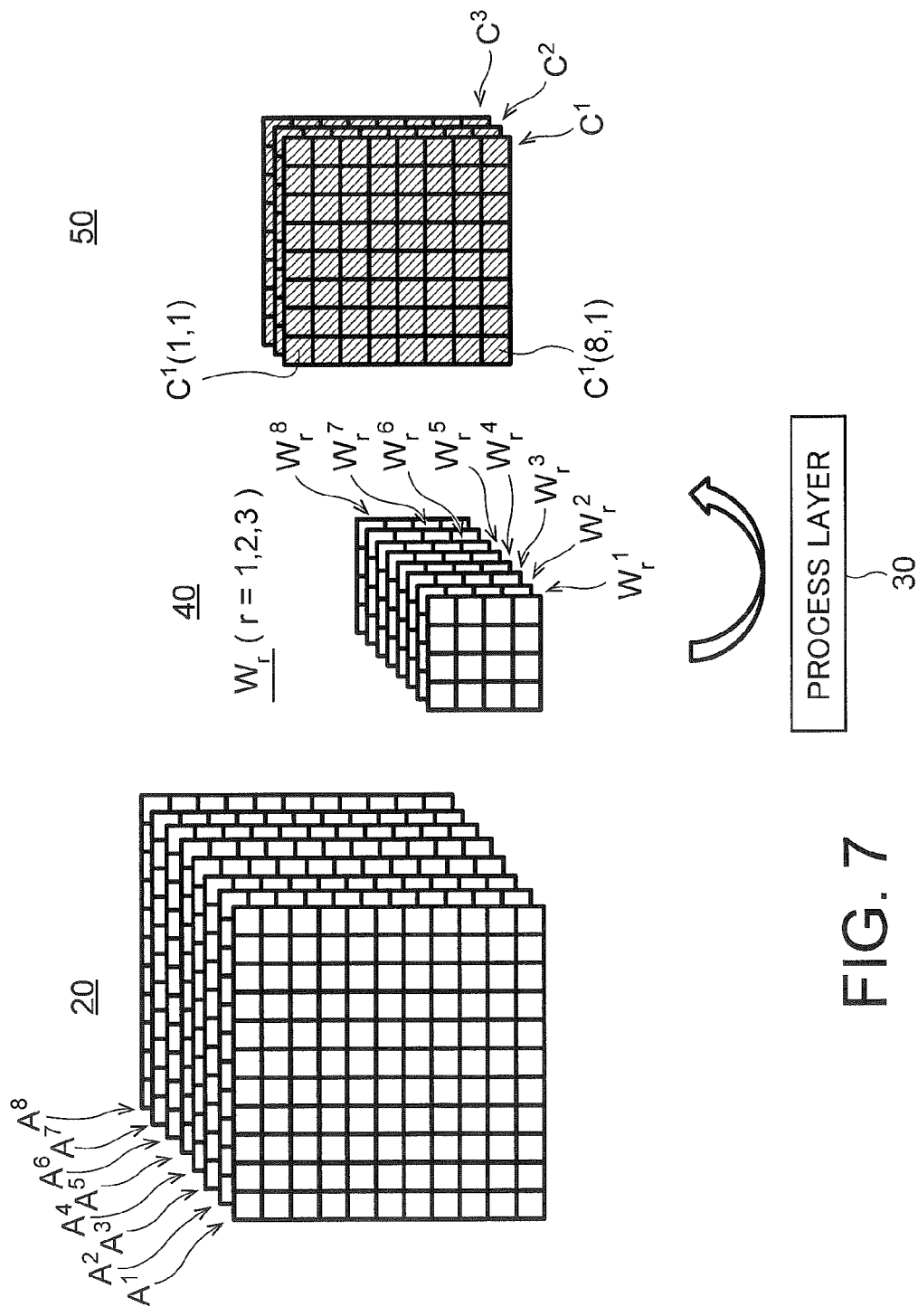
FIG. 7 is a diagram explaining a convolution process of the process layer in the first embodiment.

In the same way as described above, the total sum of products of data $A^i$ (j+p−1, k+q−1) stored in the storage device 20 and the data $W_r^i$ (j, k) stored in the storage device 40 is calculated over i (1≤i≤8), j (1≤j≤4), and k (1≤k≤4), with respect to each group of p (1≤p≤8), q (1≤q≤8), and r (1≤r≤3). The total sum is expressed as $\Sigma\Sigma\Sigma A^i$ (j+p−1, k+q−1)×$W_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The total sum is obtained by the arithmetic processor 6 shown in FIG. 3. The total sum is obtained with respect to each group of p (1≤p≤8), q (1≤q≤8), and r (1≤r≤3). In this process, the calculation of total sum with respect to r (r=1, 2, 3) can be performed in parallel, which is advantageous in achieving the shortening of process time, that is, high-speed operation. Then, a bias value $B1^r$ of the process layer 30 is added to the total sum obtained with respect to each group of p (1≤p≤8), q (1≤q≤8), and r (1≤r≤3), with application of the activation function process as required, to obtain a value which is then stored in an element $C^r$ (p, q) of an array $C^r$ of the storage device 50 shown in FIG. 1 (FIG. 7). As a result of the above process, the value stored in the element $C^r$ (p, q) of the array $C^r$ of the storage device 50 is the output of the process layer 30, having the depth of a value r, with respect to each group of p (1≤p≤8), q (1≤q≤8), and r (1≤r≤3).

(First Process of Process Layer 60)

Figure 8:
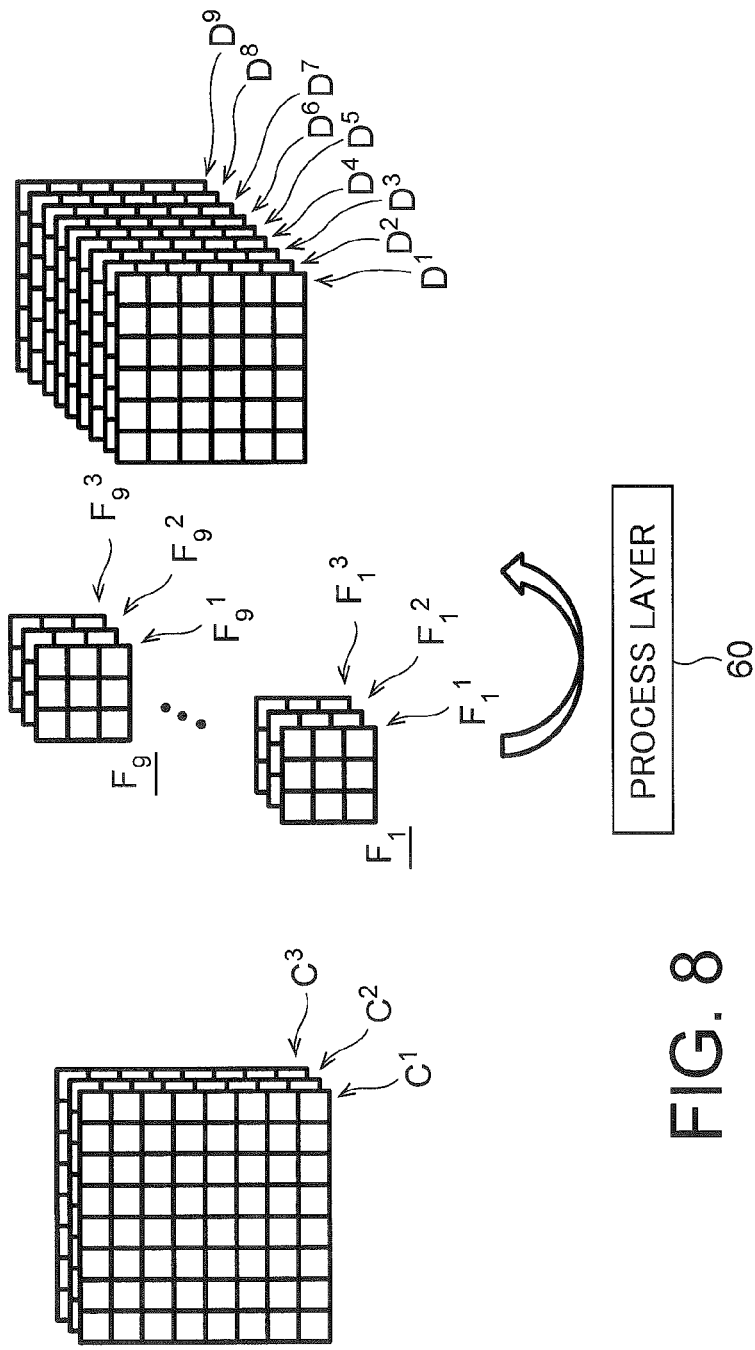
FIG. 8 is a diagram explaining a convolution process of another process layer in the first embodiment.

Subsequently, a part (first process) of a process of the process layer 60 is performed. In the same manner as in the case of the process layer 30, weight numerical values in kernels F1 to F9 to be used in the process layer 60 are read out from the external storage device 202 by the reader 2 shown in FIG. 3 and then stored in the storage device 55 located in the numerical-value storage unit 4 in the arithmetic processing device 1 (FIG. 8). A kernel $F_i$ (i=1, . . . , 9) has three arrays $F_i^1$, $F_i^2$, and $F_i^3$, each array $F_i^j$ (j=1, 2, 3) having elements (memory elements) arranged in three rows and three columns. An element of a p-th (p=1, 2, 3) row and a q-th (q=1, 2, 3) column in each array $F_i$ (j=1, 2, 3) is expressed as $F_i^j$ (p, q), the numerical value (weight) to be stored in this element being also expressed as $F_i$ (p, q).

Figure 9:
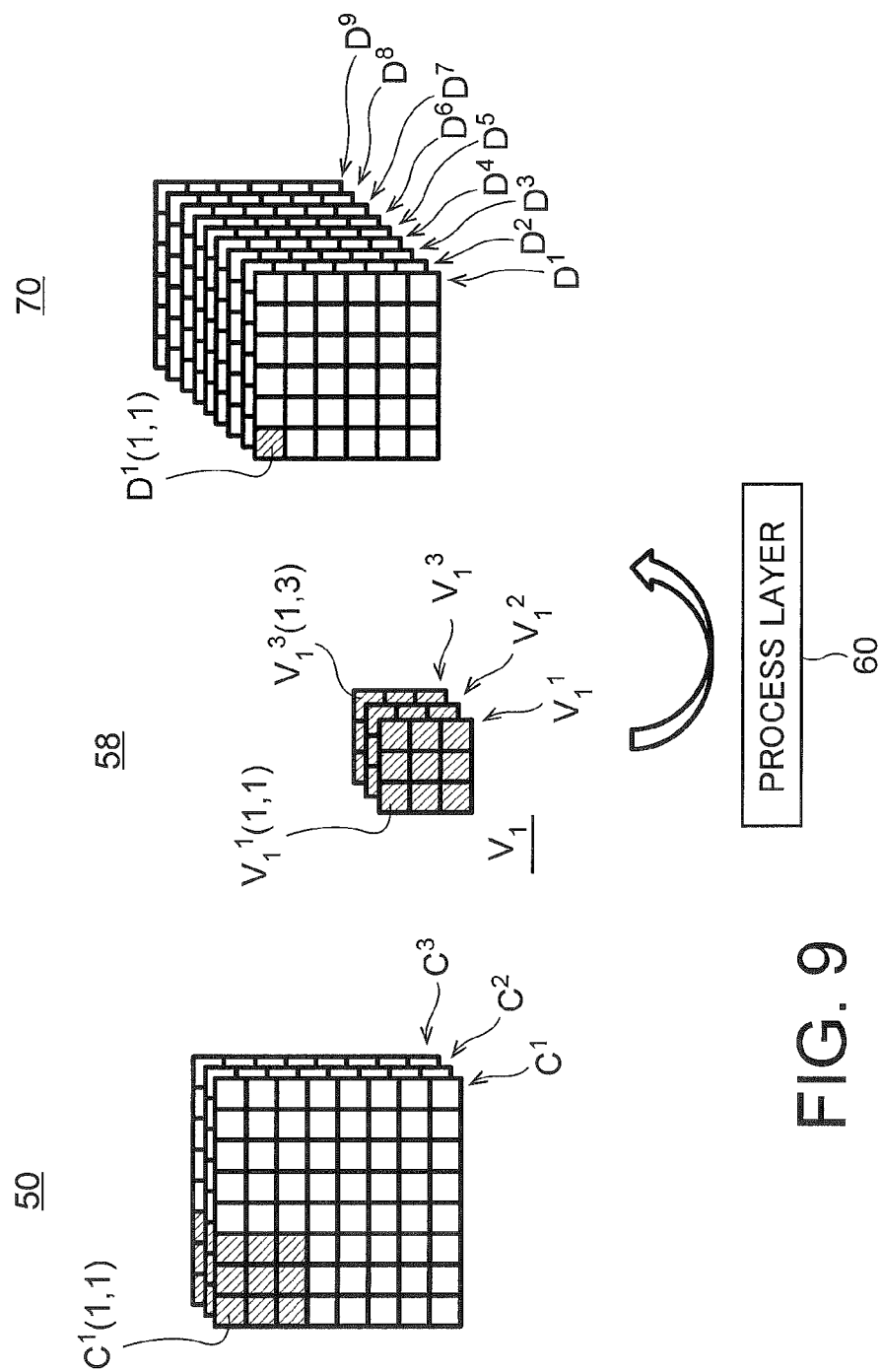
FIG. 9 is a diagram explaining a convolution process of the other process layer in the first embodiment.

The arithmetic processing device 1 uses the reader 5 shown in FIG. 3 to read out weight numerical values of the kernels $F_1$ to $F_9$ stored in the numerical-value storage unit 4 shown in FIG. 3 and stores the weight numerical values in arrays $V_1^1$ to $V_1^3$ of a kernel $V_1$ of a storage device 58. Each array $V_1^j$ (j=1, 2, 3) has elements (memory elements) arranged in three rows and three columns. An element of a p-th (p=1, 2, 3) row and a q-th (q=1, 2, 3) column in each array $V_i^j$ (j=1, 2, 3) is expressed as $V_i$ (p, q), the numerical value (weight) to be stored in this element being also expressed as $V_i^j$ (p, q). The depth of the kernel $F_i$ (k=1, . . . , 9) is 12 in depth of the input of the process layer 60. The output of the process layer 60 is stored in a storage device 70 having nine arrays $D^1$ to $D^9$ (FIG. 9). The bias value of the process layer 60 is defined as $B2^i$ (1≤i≤9).

First of all, as shown in FIG. 9, the total sum of products of data $C^i$ (j, k) of an array $C^i$ stored in the storage device 50 and data $V_1^i$ (j, k) of the kernel $V_1$ stored in the storage device 58 is calculated with respect to i (1≤i≤3), j (1≤j≤3), and k (1≤k≤3). The total sum is expressed as $\Sigma\Sigma\Sigma C^i$ (j, k)×$V_1^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The total sum is obtained by the arithmetic processor 6 shown in FIG. 3. The total sum is stored in an element $D^1$ (1, 1) of the array $D^1$ of the storage device 70. In this process, the calculation of sum of products with respect to i (i=1, 2, 3) can be performed in parallel, which is advantageous in achieving the shortening of process time, that is, high-speed operation.

Figure 10:
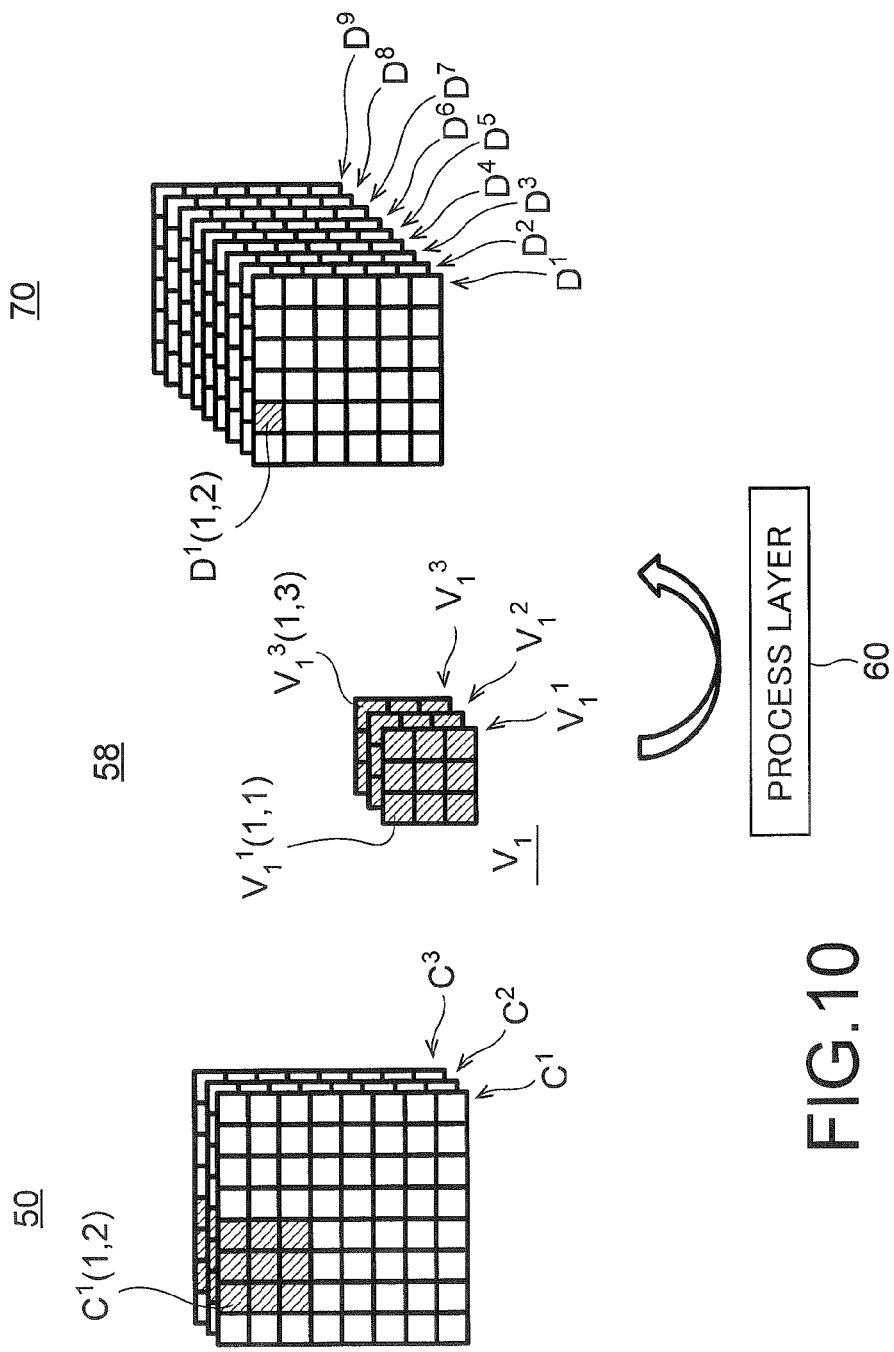
FIG. 10 is a diagram explaining a convolution process of another process layer in the first embodiment.

Subsequently, as shown in FIG. 10, the total sum of products of data $C^i$ (j, k+1) of the array $C^i$ stored in the storage device 50 and the data $V_1^i$ (j, k) of the kernel $V_1$ stored in the storage device 58 is calculated with respect to i (1≤i≤3), j (1≤j≤3), and k (1≤k≤3). The total sum is expressed as $\Sigma\Sigma\Sigma C^i$ (j, k+1)×$V_1^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The total sum is obtained by the arithmetic processor 6 shown in FIG. 3. The total sum is stored in an element $D^1$ (1, 2) of the array $D^1$ of the storage device 70. In this process, the calculation of sum of produces with respect to i (i=1, 2, 3) can be performed in parallel, which is advantageous in achieving the shortening of process time, that is, high-speed operation.

Figure 11:
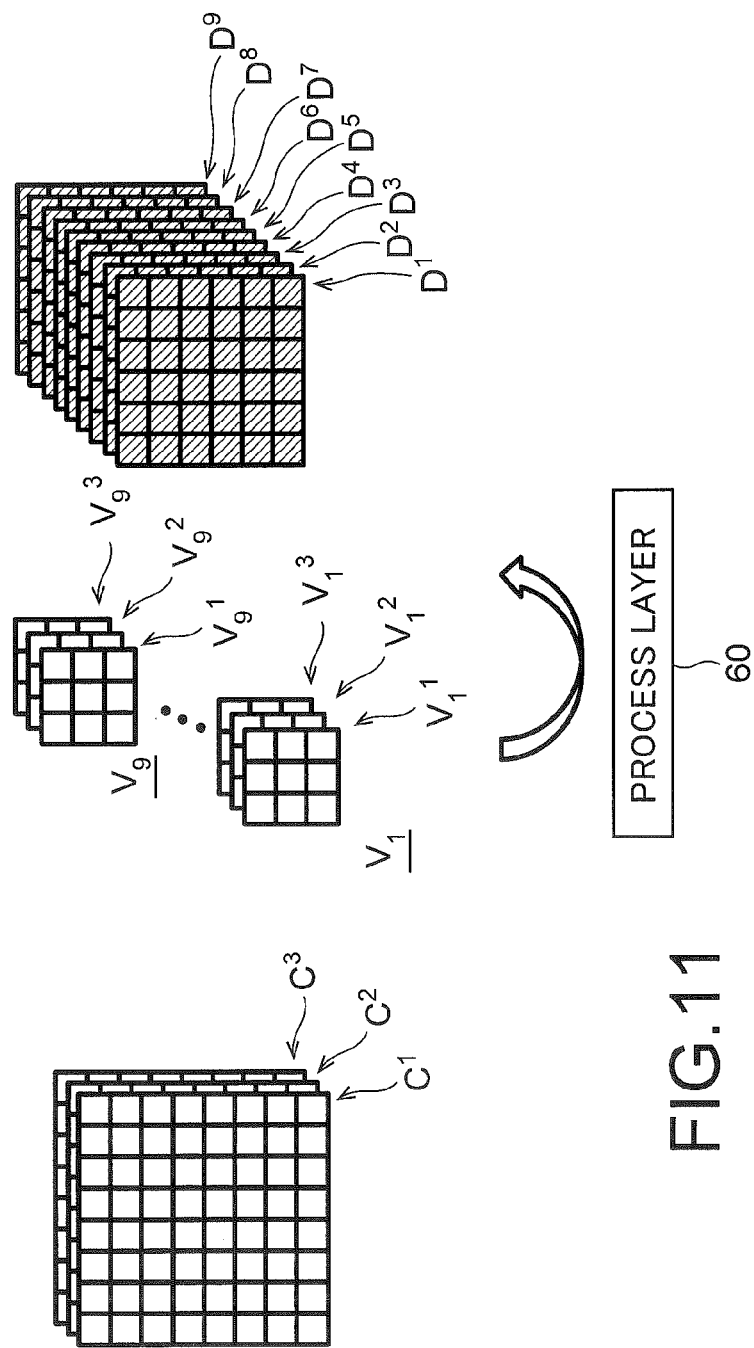
FIG. 11 is a diagram explaining a convolution process of the other process layer in the first embodiment.

In the same way as described above, the total sum of products of data $C^i$ (j+p−1, k+q−1) of the array $C^i$ (i=1, 2, 3) stored in the storage device 50 and an element $V_r^i$ (j, k) (j, k=1, 2, 3) of an array $V_r^i$ stored in the storage device 58 is calculated over i (1≤i≤3), j (1≤j≤3), and k (1≤k≤3), with respect to each group of p (1≤p≤56), q (1≤q≤6), and r (1≤r≤9). The total sum is expressed as $\Sigma\Sigma\Sigma C^i$ (j+p−1, k+q−1)×$V_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The total sum is obtained by the arithmetic processor 6 shown in FIG. 3 with respect to each group of p (1≤p≤6), q (1≤q≤6), and r (1≤r≤9), and stored in and an element $D^r$ (p, q) of an array $D^r$ of the storage device 70. FIG. 11 shows the state where this process completes. In this process, the calculation of sum of products with respect to i (i=1, 2, 3) can be performed in parallel, which is advantageous in achieving the shortening of process time, that is, high-speed operation. Moreover, the processes with respect to r (r=1, . . . , 9) can also be performed in parallel, which is advantageous in achieving the shortening of process time, that is, high-speed operation. Incidentally, the process layer 30 and the process layer 60 are included in the arithmetic processing device 6. And each of the process layer 30, the process layer 60, the reader 2, and the reader 5 is one of functions of the arithmetic processing device 1.

(Second Process of Process Layer 30)

Subsequently, a process (second process) that is a part of the process of the process layer 30 is performed. With respect to i ($1 \leq i \leq 8$), j ($1 \leq j \leq 3$), and k, m ($1 \leq k$, $m \leq 4$), a numerical value of an element $E_{j+3}^{i}$ (k, m) of an array $E_{j+3}^{i}$ of a kernel $E_{j+3}$ stored in the storage device 35 of the numerical-value storage unit 4 is read out by the reader 5 shown in FIG. 3 and stored in an element $W_j^i$ (k, m) of an array $W_j^i$ of a kernel $W_j$ of the storage device 40.

Subsequently, in the same manner as explained with reference to FIGS. 5 to 7, the total sum of products of data $A^i$ (j+p−1, k+q−1) (i=1, ..., 8, j, k=1, ..., 4) stored in the storage device 20 and data $W_r^i$ (j, k) stored in the storage device 40 is calculated over i ($1 \leq i \leq 8$), j ($1 \leq j \leq 3$), and k ($1 \leq k \leq 3$), with respect to each group of p ($1 \leq p \leq 8$), q ($1 \leq q \leq 8$), and r ($1 \leq r \leq 3$). The total sum is expressed as $\Sigma\Sigma\Sigma A^i$ (j+p−1, k+q−1)×$W_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The total sum is obtained by the arithmetic processor 6 shown in FIG. 3 with respect to each group of p ($1 \leq p \leq 8$), q ($1 \leq q \leq 8$), and r ($1 \leq r \leq 3$). In this process, the calculation of sum of products with respect to i (i=1, ..., 8) can be performed in parallel, which is advantageous in achieving the shortening of process time, that is, high-speed operation. Then, a bias value $B1^{r+3}$ of the process layer 30 is added to the value obtained with respect to each group of p ($1 \leq p \leq 8$), q ($1 \leq q \leq 8$), and r ($1 \leq r \leq 3$), with application of the activation function process as required, to obtain a value which is then stored in an element $C^r$ (p, q) of an array $C^r$ of the storage device 50. In these processes, the processes with respect to r (r=1, 2, 3) can be performed in parallel, which is advantageous in achieving the shortening of process time, that is, high-speed operation. As a result of the above process, the value stored in the element $C^r$ (p, q) of the array $C^r$ of the storage device 50 is the output of the process layer 30, having the depth of a value r+3, with respect to each group of p ($1 \leq p \leq 8$), q ($1 \leq q \leq 8$), and r ($1 \leq r \leq 3$).

(Second Process of Process Layer 60)

Subsequently, with respect to i ($1 \leq i \leq 3$), j ($1 \leq j \leq 9$), and k, m ($1 \leq k$, $m \leq 3$), a numerical value of an element $F_j^{i+3}$ (k, m) of a kernel $F_j$ stored in the storage device 55 of the numerical-value storage unit 4 shown in FIG. 3 is read out by the reader 5 shown in FIG. 3 and stored in an element $V_j^i$ (k, m) of a kernel $V_j$ stored in the storage device 58.

Subsequently, in the same manner as explained with reference to FIGS. 9 to 11, the total sum of products of data $C^i$ (j+p−1, k+q−1) stored in the storage device 50 and data $V_r^i$ (j, k) stored in the storage device 58 is calculated over i ($1 \leq i \leq 3$), j ($1 \leq j \leq 3$), and k ($1 \leq k \leq 3$), with respect to each group of p ($1 \leq p \leq 6$), q ($1 \leq q \leq 6$), and r ($1 \leq r \leq 9$). The total sum is expressed as $\Sigma\Sigma\Sigma C^i$ (j+p−1, k+q−1)×$V_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k.

A sum of the total sum obtained with respect to each group of p ($1 \leq p \leq 6$), q ($1 \leq q \leq 6$), and r ($1 \leq r \leq 9$), and the numerical value stored in the element $D^r$ (p, q) of the array $D^r$ of the storage device 70 is newly stored in the element $D^r$ (p, q).

In this process, the calculation of sum of products with respect to i (i=1, 2, 3) can be performed in parallel, which is advantageous in achieving the shortening of process time, that is, high-speed operation. The processes with respect to r (r=1, ..., 9) can also be performed in parallel, which is advantageous in achieving the shortening of process time, that is, high-speed operation.

(Third Process of Process Layer 30)

Subsequently, with respect to i ($1 \leq i \leq 8$), j ($1 \leq j \leq 3$), and k, m ($1 \leq k$, $m \leq 4$), a numerical value of an element $E_{j+6}^i$ (k, m) of a kernel $E_{j+6}$ stored in the storage device 35 of the numerical-value storage unit 4 shown in FIG. 3 is read out by the reader 5 shown in FIG. 3 and stored in the element $W_j^i$ (k, m) of the kernel $W_j$ of the storage device 40.

Subsequently, in the same manner as explained with reference to FIGS. 5 to 7, the total sum of products of data $A^i$ (j+p−1, k+q−1) stored in the storage device 20 and the data $W_r^i$ (j, k) stored in the storage device 40 is calculated over i ($1 \leq i \leq 8$), j ($1 \leq j \leq 4$), and k ($1 \leq k \leq 4$), with respect to each group of p ($1 \leq p \leq 8$), q ($1 \leq q \leq 8$), and r ($1 \leq r \leq 3$). The total sum is expressed as $\Sigma\Sigma\Sigma A'$ (j+p−1, k+q−1)×$W_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. In this process, the calculation of sum of products with respect to i (i=1, ..., 8) can be performed in parallel, which is advantageous in achieving the shortening of process time, that is, high-speed operation. Then, a bias value $B1^{r+6}$ of the process layer 30 is added to the value obtained with respect to each group of p ($1 \leq p \leq 8$), q ($1 \leq q \leq 8$), and r ($1 \leq r \leq 3$), with application of the activation function process as required, to obtain a value which is then stored in the element $C^r$ (p, q) of the array $C^r$ of the storage device 50. In these processes, the processes with respect to r (r=1, 2, 3) can be performed in parallel, which is advantageous in achieving the shortening of process time, that is, high-speed operation. As a result of the above process, the value stored in the element $C^r$ (p, q) of the array $C^r$ of the storage device 50 is the output of the process layer 30, having the depth of a value r+6, with respect to each group of p ($1 \leq p \leq 8$), q ($1 \leq q \leq 8$), and r ($1 \leq r \leq 3$).

(Third Process of Process Layer 60)

Subsequently, with respect to i ($1 \leq i \leq 3$), j ($1 \leq j \leq 9$), and k, m ($1 \leq k$, $m \leq 3$), a numerical value stored in an element $F_j^{i+6}$ (k, m) of the storage device 55 of the numerical-value storage unit 4 shown in FIG. 3 is read out by the reader 5 shown in FIG. 3 and stored in an element $V_j^i$ (k, m) of a kernel $V_j$ of the storage device 58.

Subsequently, in the same manner as explained with reference to FIGS. 9 to 11, the total sum of products of data $C^i$ (j+p−1, k+q−1) of the array $C^i$ of the storage device 50 and data $V_r^i$ (j, k) of a kernel $V_r$ stored in the storage device 58 is calculated over i ($1 \leq i \leq 3$), j ($1 \leq j \leq 3$), and k ($1 \leq k \leq 3$), with respect to each group of p ($1 \leq p \leq 6$), q ($1 \leq q \leq 6$), and r ($1 \leq r \leq 9$). The total sum is expressed as $\Sigma\Sigma\Sigma C^i$ (j+p−1, k+q−1)×$V_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. In this process, the calculation of sum of products with respect to i can be performed in parallel, which is advantageous in achieving the shortening of process time, that is, high-speed operation. A sum of the total sum obtained with respect to each group of p ($1 \leq p \leq 8$), q ($1 \leq q \leq 8$), and r ($1 \leq r \leq 3$), and the numerical value stored in the element $D^r$ (p, q) of the array $D^r$ of the storage device 70 is newly stored in the element $D^r$ (p, q).

In this process, the calculation of sum of products with respect to i (i=1, 2, 3) can be performed in parallel, which is advantageous in achieving the shortening of process time, that is, high-speed operation. The processes with respect to r (r=1, . . . , 9) can also be performed in parallel, which is advantageous in achieving the shortening of process time, that is, high-speed operation.

(Fourth Process of Process Layer 30)

Subsequently, with respect to i ($1 \leq i \leq 8$), j ($1 \leq j \leq 3$), and k, m ($1 \leq k$, $m \leq 4$), a numerical value of an element $E_{j+9}^{i}$ (k, m) of the storage device 35 of the numerical-value storage unit 4 shown in FIG. 3 is read out by the reader 5 shown in FIG. 3 and stored in an element $W_j^i$ (k, m) of the storage device 40.

Subsequently, in the same manner as explained with reference to FIGS. 5 to 7, the total sum of products of data $A^i$ (j+p−1, k+q−1) stored in the storage device 20 and data $W_r^i$ (j, k) stored in the storage device 40 is calculated over i ($1 \leq i \leq 8$), j ($1 \leq j \leq 4$), and k ($1 \leq k \leq 4$), with respect to each group of p ($1 \leq p \leq 8$), q ($1 \leq q \leq 8$), and r ($1 \leq r \leq 3$). The total sum is expressed as $\Sigma\Sigma\Sigma A'$ (j+p−1, k+q−1)×$W_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. In this process, the calculation of sum of products with respect to i (i=1, . . . , 8) can be performed in parallel, which is advantageous in achieving the shortening of process time, that is, high-speed operation.

Then, a bias value $B1_r^{r+9}$ of the process layer 30 is added to the value obtained with respect to each group of p ($1 \leq p \leq 8$), q ($1 \leq q \leq 8$), and r ($1 \leq r \leq 3$), with application of the activation function process as required, to obtain a value which is then stored in the element $C^r$ (p, q) of the array $C^r$ of the storage device 50. In these processes, the processes with respect to r (r=1, 2, 3) can be performed in parallel, which is advantageous in achieving the shortening of process time, that is, high-speed operation. As a result of the above process, the value stored in the element $C^r$ (p, q) of the array $C^r$ is the output of the process layer 30, having the depth of a value r+9, with respect to each group of p ($1 \leq p \leq 8$), q ($1 \leq q \leq 8$), and r ($1 \leq r \leq 3$).

(Fourth Process of Process Layer 60)

Subsequently, with respect to i ($1 \leq i \leq 3$), j ($1 \leq j \leq 9$), and k, m ($1 \leq k$, $m \leq 3$), a numerical value of an element $E_j^{i+9}$ (k, m) of the storage device 55 of the numerical-value storage unit 4 shown in FIG. 3 is read out by the reader 5 shown in FIG. 3 and stored in an element $V_j^i$ (k, m) of the storage device 58.

Subsequently, in the same manner as explained with reference to FIGS. 9 to 11, the total sum of products of data $C^i$ (j+p−1, k+q−1) stored in the storage device 50 and data $V_r^i$ (j, k) stored in the storage device 58 is calculated over i ($1 \leq i \leq 3$), j ($1 \leq j \leq 3$), and k ($1 \leq k \leq 3$), with respect to each group of p ($1 \leq p \leq 6$), q ($1 \leq q \leq 6$), and r ($1 \leq r \leq 9$). The total sum is expressed as $\Sigma\Sigma\Sigma C^i$ (j+p−1, k+q−1)×$V_r^i$ (j, k). The first total-sum sign $\Sigma$ means that the total sum is obtained with respect to i. The second total-sum sign Z means that the total sum is obtained with respect to j. The third total-sum sign $\Sigma$ means that the total sum is obtained with respect to k. In this process, the calculation of sum of products with respect to i (i=1, 2, 3) can be performed in parallel, which is advantageous in achieving the shortening of process time, that is, high-speed operation.

Then, the numerical value stored in the element $D^r$ (p, q) of the array $D^r$ of the storage device 70 and a bias value $B2^r$ of the process layer 60 are added to the value obtained with respect to each group of p ($1 \leq p \leq 6$), q ($1 \leq q \leq 6$), and r ($1 \leq r \leq 9$), with application of the activation function process as required, to obtain a value which is then stored in the element $D^r$ (p, q) of the array $D^r$ of the storage device 70. In these processes, the processes with respect to r (r=1, . . . , 9) can be performed in parallel, which is advantageous in achieving the shortening of process time, that is, high-speed operation. As a result of the above process, the value stored in the element $D^r$ (p, q) of the array $D^r$ is the output of the process layer 60, having the depth of a value r, with respect to each group of p ($1 \leq p \leq 6$), q ($1 \leq q \leq 6$), and r ($1 \leq r \leq 9$).

A result of process obtained by the arithmetic processor 6 shown in FIG. 3 as described above is stored in an external storage device 300 via an output unit 8.

As explained above, according to the present embodiment, the number (=3) of the arrays of the storage device 50 that stores the output of the process layer 30 is smaller than the number of the output of the process layer 30, that is, the number (=12) of the kernels stored in the storage device 35. Accordingly, it is achieved to provide an arithmetic processing device capable of reducing capacity of storage devices. Since, the capacity of storage devices can be reduced, the circuit area can be made smaller to restrict the production cost.

In the present embodiment, the number (=3) of the kernels $W_1$ to $W_3$ in the storage device 40 is equal to the depth (=3) of the arrays $C^1$ to $C^3$ of the storage device 50, which is however, not necessary, that is, the both may be different values from each other. Nevertheless, if the number of the kernels $W_1$ to $W_3$ in the storage device 40 is larger than the depth of the arrays $C^1$ to $C^3$ of the storage device 50, kernels among the kernels of the storage device 40, the index of which goes beyond the depth of the arrays $C^1$ to $C^3$ of the storage device 50, are not used in the process explained with respect to FIGS. 5 to 7, which is waste of arrays. On the other hand, if the number of the kernels of the storage device 40 is smaller than the depth of the arrays of the storage device 50, the depth in the arrays of the storage device 50, which goes beyond the number of the kernels of the storage device 40, is not used in the process explained with respect to FIGS. 5 to 7, which is waste of depth. It is, therefore, preferable that the number of the kernels of the storage device 40 and the depth the arrays of the storage device 50 are equal to each other.

Moreover, in the present embodiment, the depth of the kernels in the storage devices 55 and 58 is equal to the depth of the arrays of the storage device 50, which is however, not necessary, that is, the both may be different values from each other. If the depth of the kernels in the storage devices 55 and 58 is larger than the depth of the arrays of the storage device 50, the depth, among the depths of the kernels of the storage device 58, which goes beyond the depth of the arrays of the storage device 50, is not used in the process explained with respect to FIGS. 9 to 11, which is waste of depth. On the other hand, if the depth of the kernels of the storage device 58 is smaller than the depth of the arrays of the storage device 50, the depth, among the depths of the kernels of the storage device 50, which goes beyond the depth of the arrays of the kernels of the storage device 58, is not used in the process explained with respect to FIGS. 9 to 11, which is waste of depth. It is, therefore, preferable that the depth of the kernels in the storage devices 55 and 58, and the depth of the arrays of the storage device 50 are equal to each other.

It is, especially, preferable that the number of the kernels in the storage device 40, the depth of the arrays of the storage device 50, and the depth the arrays of the kernels of the storage devices 55 and 58 are equal to one another.

In the present embodiment, the number of the kernels of the storage device 40, the depth of the arrays of the storage device 50, and the depth of the kernels of the storage device 58 are all 3 which is a divisor of 12 that is the depth of the output of the process layer 30, that is, the depth of the input of the process layer 60. However, this is not always necessary. In the case of setting the same value to the number of the kernels of the storage device 40, the depth of the arrays of the storage device 50, and the depth the kernels of the storage device 58, the above same value may not be a divisor of the depth of the output of the process layer 30, that is, the depth of the input of the process layer 60. Nevertheless, when the three same values of the number of the kernels of the storage device 40, the depth of the arrays of the storage device 50, and the depth the kernels of the storage device 58 are a divisor of the depth of the output of the process layer 30, that is, the depth of the input of the process layer 60, there is an advantage of no waste in alternately performing the process explained with reference to FIGS. 5 to 8 and the process explained with reference to FIGS. 9 to 11, in the present embodiment. Therefore, it is preferable that the three values of the number of the kernels of the storage device 40, the depth of the arrays of the storage device 50, and the depth the kernels of the storage device 58 are the same value and this same value is a divisor of the depth of the output of the process layer 30, that is, the depth of the input of the process layer 60.

What is explained in the present embodiment is the convolution process only, without referring to a pooling process. However, since the pooling process is performed independently for each depth, even if the pooling process is performed following to the convolution process of the process layer 30 or the process layer 60, the same effects as described above can be obtained.

In the present embodiment, the storage device 50 that stores the output of the process layer 30 has the same size as the output of the process layer 30, that is, a size of 8×8 in the in-plane direction in the figures, and has a depth of 3. However, the storage device that stores the output of the process layer 30 may have a one-dimensional arrangement with a length equal to the size of the process layer 30 in the in-plane direction (for example, the Japanese Patent Application No. 2017-222293 filed by the present applicant). Nevertheless, if such a storage device is used, in the process of storing values of the arrays of the storage device 55 in the arrays of the storage device 58, it is required to perform, a plurality of times, the process of storing the same numerical value from the storage device 55 to the storage device 58. This results in excessive increase in the access times to the storage devices, hence requiring an unnecessary process time, which preventing high-speed processing. Therefore, as shown in the present embodiment, it is preferable that the first storage device that stores the output of the process layer 30 has a size equal to the output of the process layer 30, in both of the row and column directions in the in-plane direction in the figures.

In the present embodiment, every process of the process layer 30 or the process layer 60 is the convolution process. However, this is not always necessary. In general, it is a full connection process if the input or output of a process layer has a size of 1×1 in the in-plane direction in the figures. Therefore, even if the process of the process layer 30 or the process layer 60 is the full connection process, the same effects as described above can be obtained. Nevertheless, in one process, whereas in the full connection process, each weight is used only once, in the convolution process, each weight is used a plurality of times. Therefore, in view of the process time as a result of the access times to the storage devices, the same effects as described above can be obtained, especially, in the case where every process of the process layer 30 or the process layer 60 is the convolution process.

Second Embodiment

Figure 12:
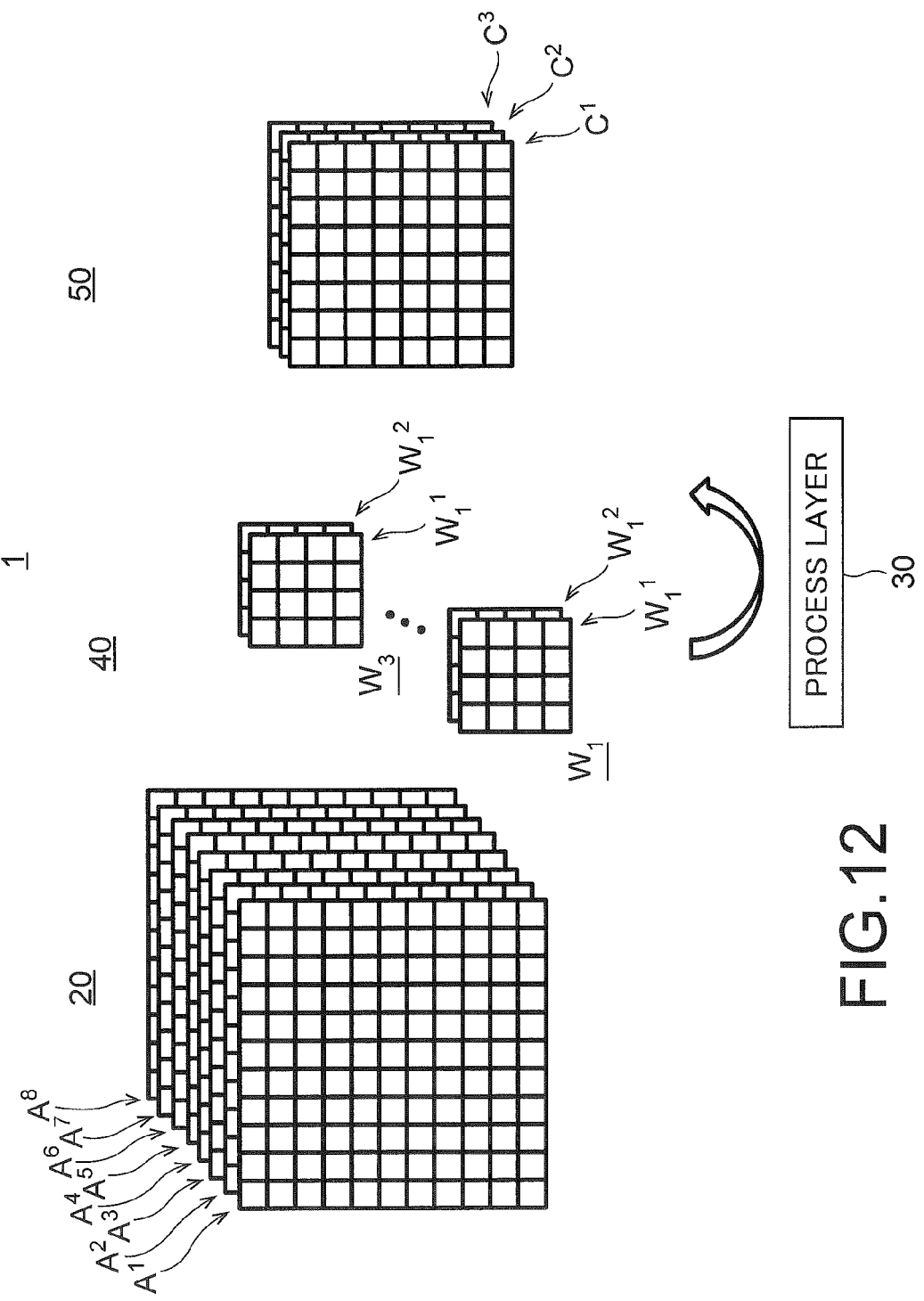
FIG. 12 is a diagram explaining the outline of an arithmetic processing device according to a second embodiment.

An arithmetic processing device according to a second embodiment will be explained with reference to FIGS. 12 to 19. An arithmetic processing device 1 of the second embodiment is different from the arithmetic processing device of the first embodiment shown in FIGS. 1 to 11, in the depth of kernels used in the process layer 30, that is, the number of arrays included in the kernels. In the first embodiment, the number (=8) of arrays included in the kernels stored in the storage device 40 is equal to the depth of the input of the process layer 30, that is, the number (=8) of arrays stored in the storage device 20. As shown in FIG. 12, in the second embodiment, the number of kernels to be used in the process layer 30 and to be stored in the storage device 40 is 3, each kernel having two arrays. Each array has memory elements arranged in four rows and four columns. In other words, the second embodiment is different from the first embodiment, in the depth of kernels to be used in the process layer 30.

Subsequently, an operation of the arithmetic processing device of the second embodiment will be explained.

(First Process of Process Layer 30)

First of all, with respect to i ($1 \leq i \leq 2$), j ($1 \leq j \leq 3$), and k, m ($1 \leq k, m \leq 4$), a numerical value stored in an element $E_j^i$ (k, m) of a kernel stored in the storage device 35 of the numerical-value storage unit 4 shown in FIG. 3 is read out by the reader 5 shown in FIG. 3 and stored in an element $W_j^i$ (k, m) of a kernel $W_j$ stored in the storage device 40.

Figure 13:
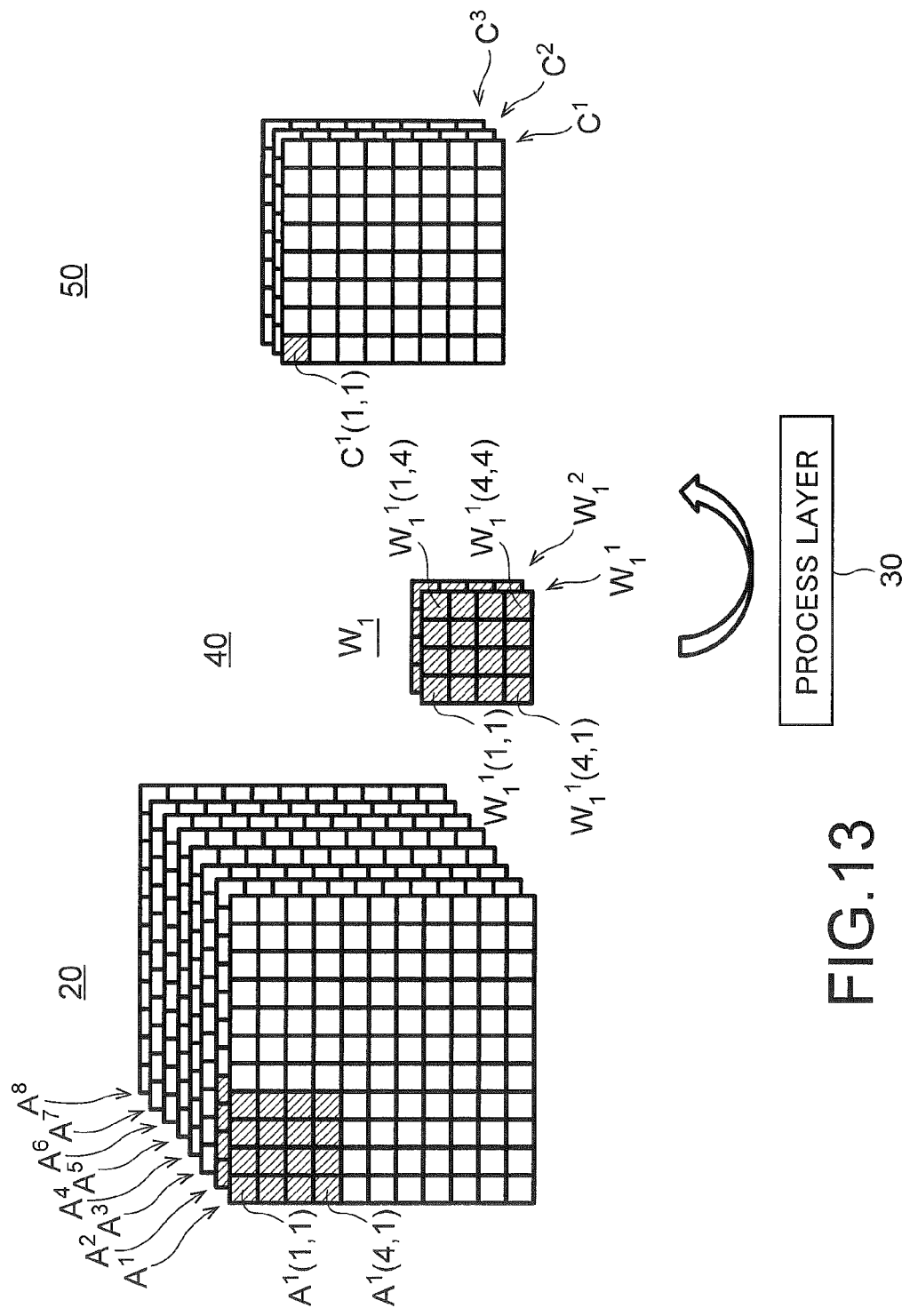
FIG. 13 is a diagram explaining a convolution process of a process layer in the second embodiment.

Subsequently, as shown in FIG. 13, the total sum of products of data $A^i$ (j, k) stored in the storage device 20 and data $W_1^i$ (j, k) stored in the storage device 40 is calculated over i ($1 \leq i \leq 2$), j ($1 \leq j \leq 4$), and k ($1 \leq k \leq 4$). The total sum is expressed as $\Sigma\Sigma\Sigma A^i$ (j, k)$\times W_1^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The total sum is stored in an element $C^1$ (1, 1) of an array $C^1$ of the storage device 50. In this process, the calculation of sum of products with respect to i (i=1, 2) can be performed in parallel, which is advantageous in achieving the shortening of process time, that is, high-speed operation.

Figure 14:
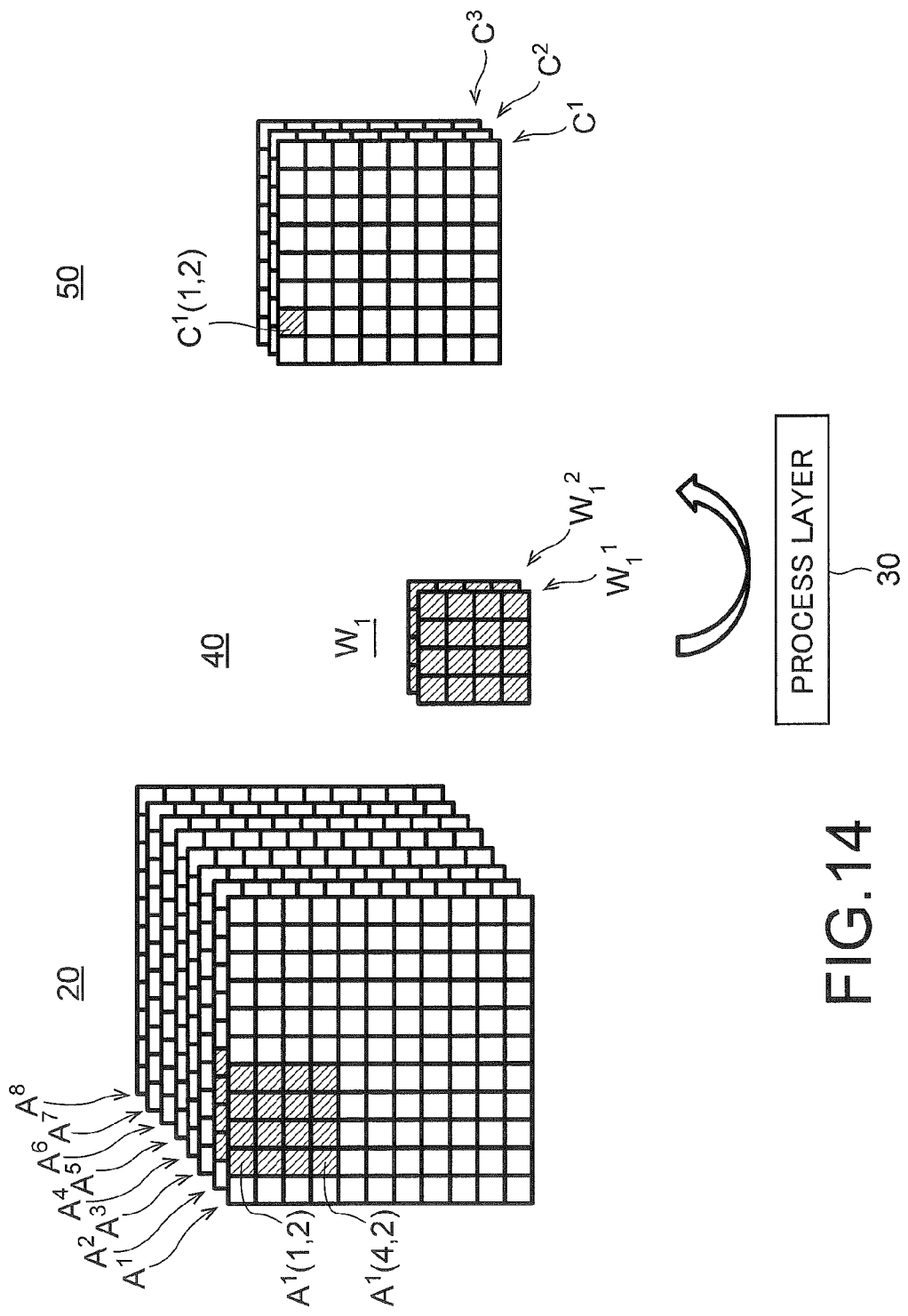
FIG. 14 is a diagram explaining a convolution process of the process layer in the second embodiment.

Subsequently, as shown in FIG. 14, the total sum of products of data $A^i$ (j, k+1) stored in the storage device 20 and the data $W_1^i$ (j, k) stored in the storage device 40 is calculated over i ($1 \leq i \leq 2$), j ($1 \leq j \leq 4$), and k ($1 \leq k \leq 4$). The total sum is expressed as $\Sigma\Sigma\Sigma A'$ (j, k+1)$\times W_1^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The total sum is stored in an element $C^1$ (1, 2) of the array $C^1$ of the storage device 50. In this process, the calculation of sum of products with respect to i (i=1, 2) can be performed in parallel, which is advantageous in achieving the shortening of process time, that is, high-speed operation.

Figure 15:
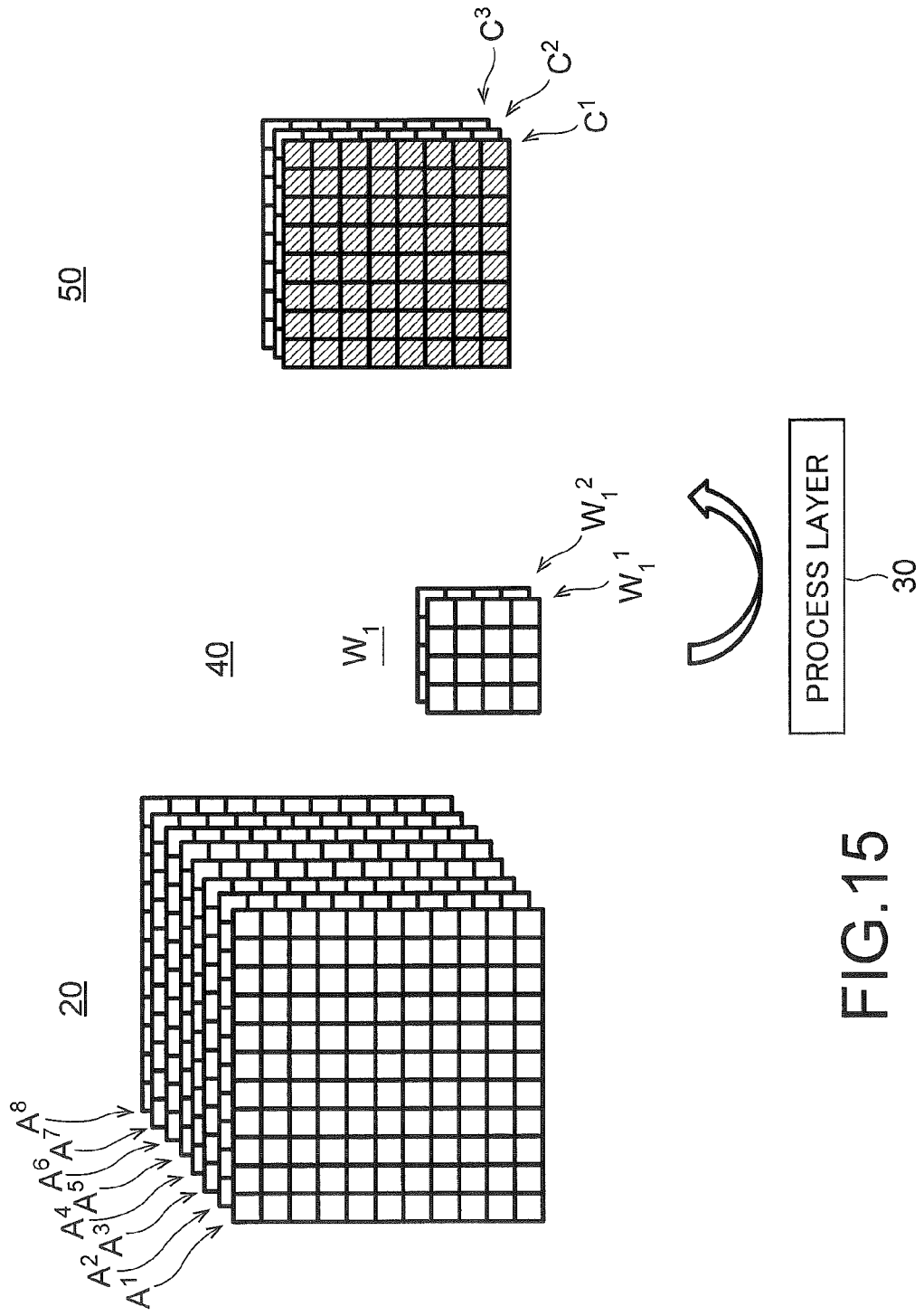
FIG. 15 is a diagram explaining a convolution process of the process layer in the second embodiment.

In the same way as described above, the total sum of products of data $A^i$ (j+p−1, k+q−1) stored in the storage device 20 and the data $W_{1'}$ (j, k) stored in the storage device 40 is calculated over i ($1 \leq i \leq 2$), j ($1 \leq j \leq 4$), and k ($1 \leq k \leq 4$), with respect to each group of p ($1 \leq p \leq 8$) and q ($1 \leq q \leq 8$). The total sum is expressed as $\Sigma\Sigma\Sigma A^i$ (j+p−1, k+q−1)$\times W_1^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The total sum is obtained with respect to each group of p ($1 \leq p \leq 8$) and q ($1 \leq q \leq 8$), and stored in an element $C^1$ (p, q) of the array $C^1$ of the storage device 50. In this process, the calculation of sum of products with respect to i (i=1, 2) can be performed in parallel, which is advantageous in achieving the shortening of process time, that is, high-speed operation. FIG. 15 shows the state where this process completes.

Figure 16:
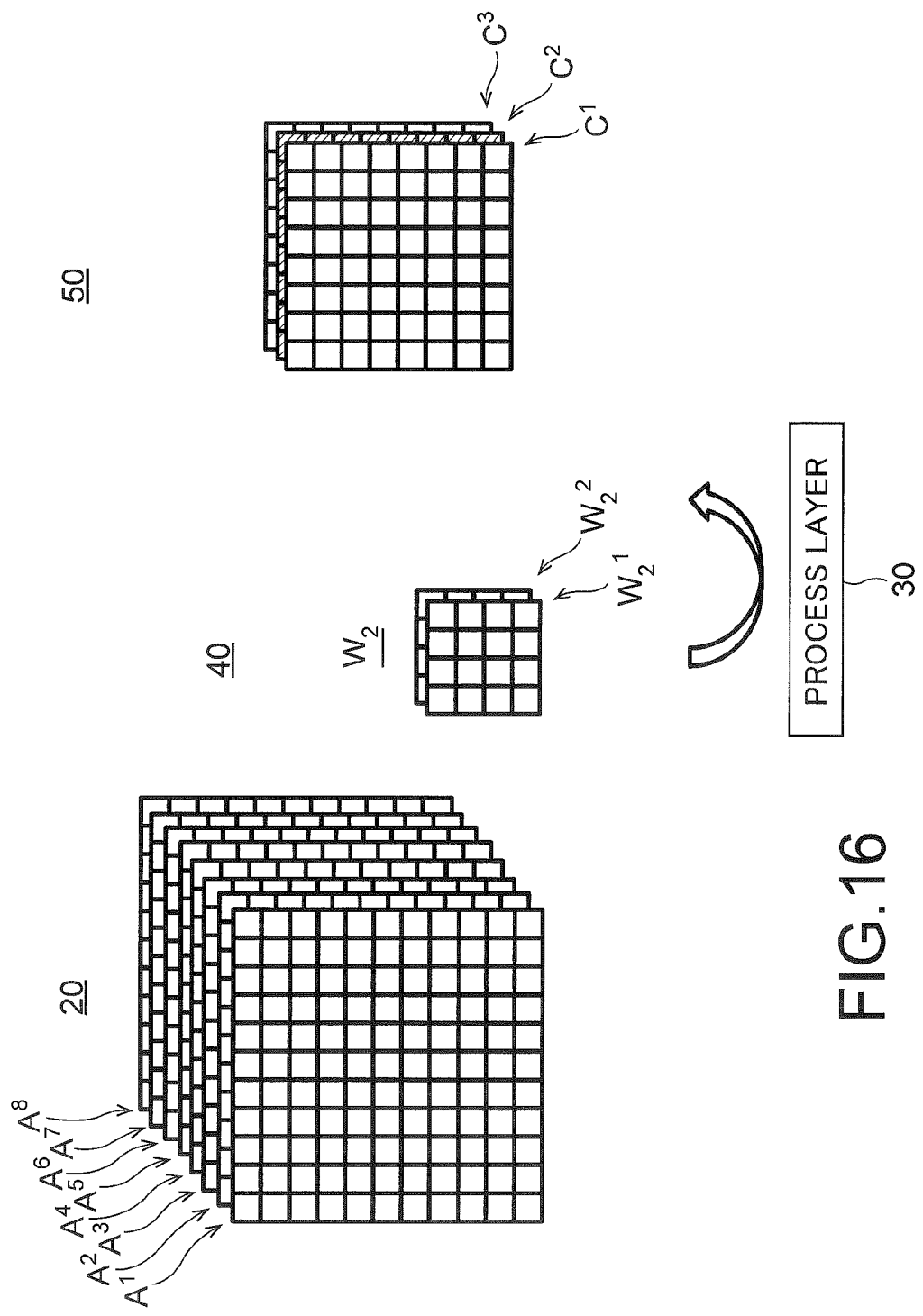
FIG. 16 is a diagram explaining a convolution process of the process layer in the second embodiment.

Subsequently, the total sum of products of data $A^i$ (j+p−1, k+q−1) stored in the storage device 20 and data $W_2^i$ (j, k) stored in the storage device 40 is calculated over i ($1 \leq i \leq 2$), j ($1 \leq j \leq 4$), and k ($1 \leq k \leq 4$), with respect to each group of p ($1 \leq p \leq 8$) and q ($1 \leq q \leq 8$). The total sum is expressed as $\Sigma\Sigma\Sigma A^i$ (j+p−1, k+q−1)×$W_2^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The total sum is obtained with respect to each group of p ($1 \leq p \leq 8$) and q ($1 \leq q \leq 8$), and stored in an element $C^2$ (p, q) of an array $C^2$ of the storage device 50. In this process, the calculation of sum of products with respect to i (i=1, 2) can be performed in parallel, which is advantageous in achieving the shortening of process time, that is, high-speed operation. FIG. 16 shows the state where this process completes.

Figure 17:
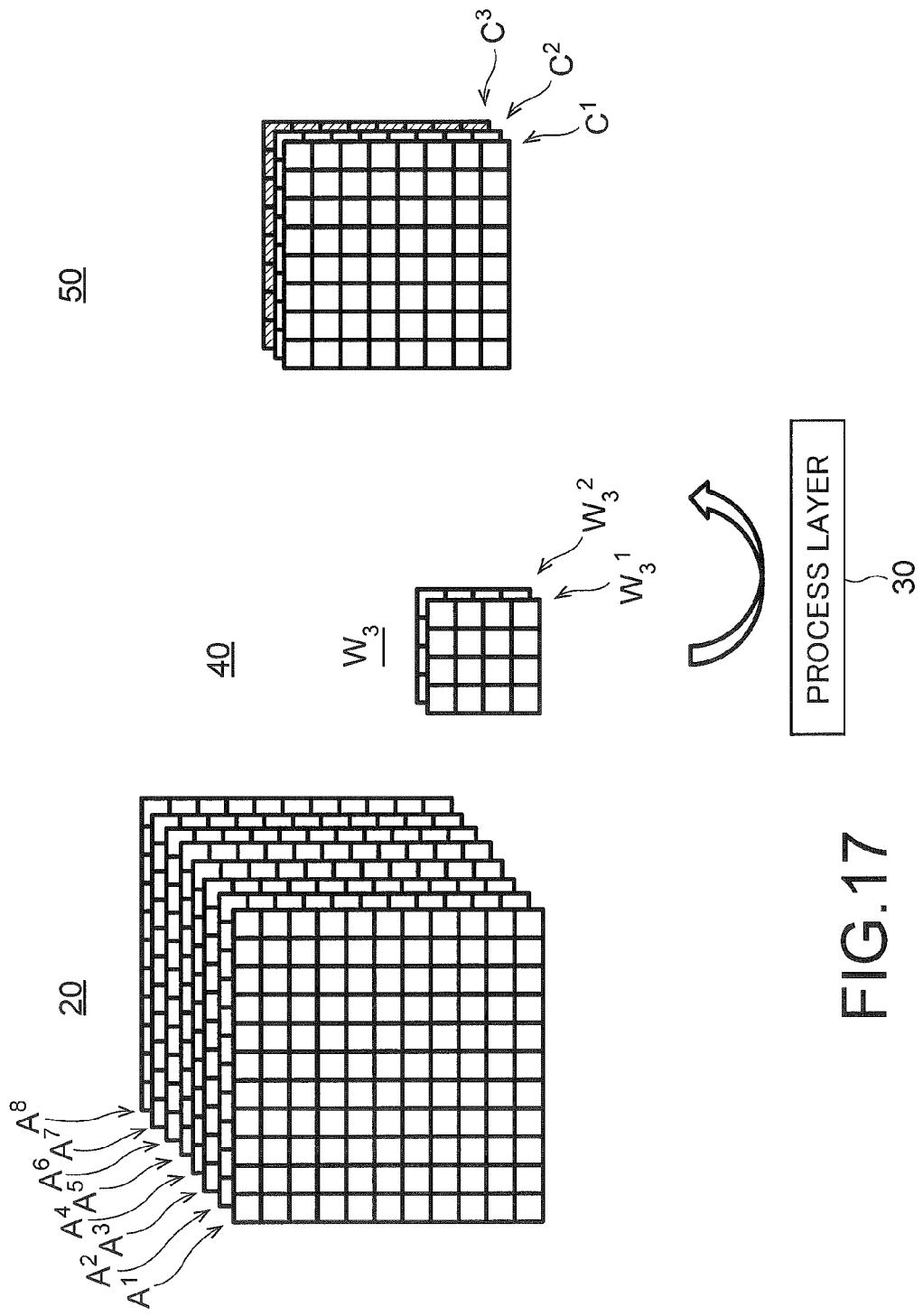
FIG. 17 is a diagram explaining a convolution process of the process layer in the second embodiment.

Subsequently, the total sum of products of data $A^i$ (j+p−1, k+q−1) stored in the storage device 20 and data $W_3^i$ (j, k) stored in the storage device 40 is calculated over i ($1 \leq i \leq 2$), j ($1 \leq j \leq 4$), and k ($1 \leq k \leq 4$), with respect to each group of p ($1 \leq p \leq 8$) and q ($1 \leq q \leq 8$). The total sum is expressed as $\Sigma\Sigma\Sigma A'$ (j+p−1, k+q−1)×$W_3^i$ (j, k). The first total-sum sign Z means that the total sum is obtained with respect to i. The second total-sum sign $\Sigma$ means that the total sum is obtained with respect to j. The third total-sum sign $\Sigma$ means that the total sum is obtained with respect to k. The total sum is obtained with respect to each group of p ($1 \leq p \leq 8$) and q ($1 \leq q \leq 8$), and stored in an element $C^3$ (p, q) of an array $C^3$ of the storage device 50. In this process, the calculation of sum of products with respect to i (i=1, 2) can be performed in parallel, which is advantageous in achieving the shortening of process time, that is, high-speed operation. FIG. 17 shows the state where this process completes. The processes explained with respect to FIG. 13 to FIG. 15, with respect to FIG. 16, and with respect to FIG. 17 can be performed in parallel, which is advantageous in achieving the shortening of process time, that is, high-speed operation.

Subsequently, with respect to i ($1 \leq i \leq 2$), j ($1 \leq j \leq 3$), and k, m ($1 \leq k$, m$\leq 4$), a numerical value of an element $E_j^{i+2}$ (k, m) of an array $E_j^i+2$ stored in the storage device 35 of the numerical-value storage unit 4 shown in FIG. 3 is read out by the reader 5 shown in FIG. 3 and stored in the element $W_j^i$ (k, m) of the array $W_j$ of the storage device 40.

Figure 18:
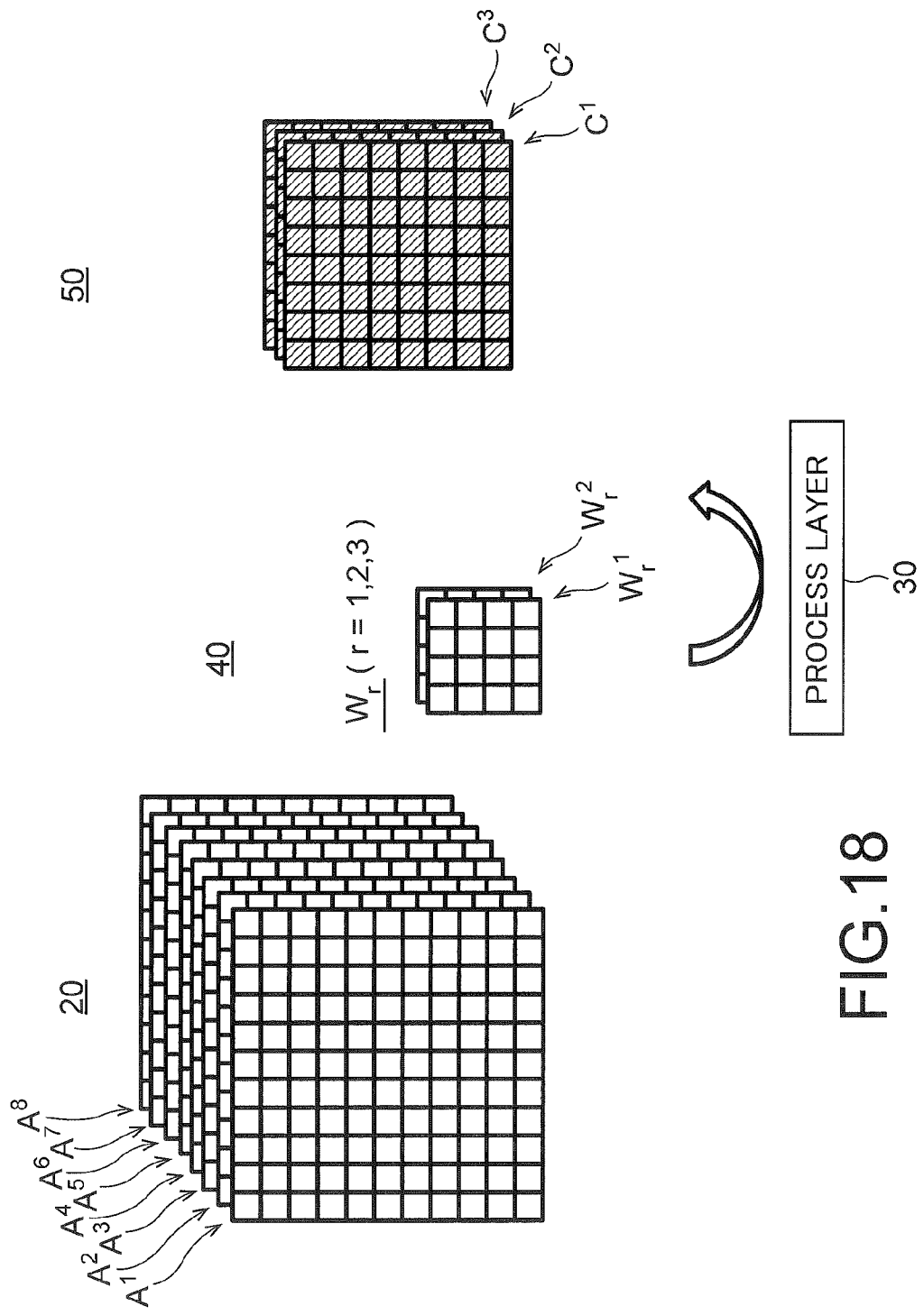
FIG. 18 is a diagram explaining a convolution process of the process layer in the second embodiment.

In the same way as described above with respect to FIGS. 13 to 17, the total sum of products of data $A^{i+2}$ (j+p−1, k+q−1) stored in the storage device 20 and data $W_r^i$ (j, k) stored in the storage device 40 is calculated over i ($1 \leq i \leq 2$), j ($1 \leq j \leq 4$), and k ($1 \leq k \leq 4$), with respect to each group of p ($1 \leq p \leq 8$), q ($1 \leq q \leq 8$), and r ($1 \leq r \leq 3$). The total sum is expressed as $\Sigma\Sigma\Sigma A^{i+2}$ (j+p−1, k+q−1)×$W_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. A sum of the total sum obtained with respect to each group of p ($1 \leq p \leq 8$), q ($1 \leq q \leq 8$), and r ($1 \leq r \leq 3$), and an element $C^r$ (p, q) of an array $C^r$ of the storage device 50 is newly stored in the element $C^r$ (p, q). In this process, the calculation of sum of products with respect to i (i=1, 2) can be performed in parallel, which is advantageous in achieving the shortening of process time, that is, high-speed operation. In these processes, the processes with respect to r (r=1, 2, 3) can be performed in parallel, which is advantageous in achieving the shortening of process time, that is, high-speed operation. FIG. 18 shows the state where this process completes.

Subsequently, with respect to i ($1 \leq i \leq 2$), j ($1 \leq j \leq 3$), and k, m ($1 \leq k$, m$\leq 4$), a numerical value of an element $E_j^{i+4}$ (k, m) of an array $E_j^{i+4}$ stored in the storage device 35 of the numerical-value storage unit 4 shown in FIG. 3 is read out by the reader 5 shown in FIG. 3 and stored in the element $W_j^i$ (k, m) of the array $W_j^i$ of the storage device 40.

In the same way as described above with respect to FIG. 18, the total sum of products of data $A^{i+4}$ (j+p−1, k+q−1) stored in the storage device 20 and the data $W_r^i$ (j, k) stored in the storage device 40 is calculated over i ($1 \leq i \leq 2$), j ($1 \leq j \leq 4$), and k ($1 \leq k \leq 4$), with respect to each group of p ($1 \leq p \leq 8$), q ($1 \leq q \leq 8$), and r ($1 \leq r \leq 3$). The total sum is expressed as $\Sigma\Sigma\Sigma A^{i+4}$ (j+p−1, k+q−1)×$W_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. A sum of the total sum obtained with respect to each group of p ($1 \leq p \leq 8$), q ($1 \leq q \leq 8$), and r ($1 \leq r \leq 3$), and the numerical value stored in the element $C^r$ (p, q) of the array $C^r$ of the storage device 50 is newly stored in the element $C^r$ (p, q). In this process, the calculation of sum of products with respect to i (i=1, 2) can be performed in parallel, which is advantageous in achieving the shortening of process time, that is, high-speed operation. Moreover, in these processes, the processes with respect to r (r=1, 2, 3) can be performed in parallel, which is advantageous in achieving the shortening of process time, that is, high-speed operation.

Subsequently, with respect to i ($1 \leq i \leq 2$), j ($1 \leq j \leq 3$), and k, m ($1 \leq k$, m$\leq 4$), a numerical value of an element $E_j^{i+6}$ (k, m) of an array $E_j^{i+6}$ stored in the storage device 35 of the numerical-value storage unit 4 shown in FIG. 3 is read out by the reader 5 shown in FIG. 3 and stored in the element $W_j^i$ (k, m) of the array $W_j^i$ of the storage device 40.

In the same way as described above with respect to FIG. 18, the total sum of products of data $A^{i+6}$ (j+p−1, k+q−1) stored in the storage device 20 and the data $W_r^i$ (j, k) stored in the storage device 40 is calculated over i ($1 \leq i \leq 2$), j ($1 \leq j \leq 4$), and k ($1 \leq k \leq 4$), with respect to each group of p ($1 \leq p \leq 8$) and q ($1 \leq q \leq 8$), and r ($1 \leq r \leq 3$). The total sum is expressed as $\Sigma\Sigma\Sigma A^{i+6}$ (j+p−1, k+q−1)×$W_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. A sum of the total sum obtained with respect to each group of p ($1 \leq p \leq 8$), q ($1 \leq q \leq 8$), and r ($1 \leq r \leq 3$), and the element $C^r$ (p, q) of the array $C^r$ stored in the storage device 50 is calculated. Then, a bias value $B1^r$ of the process layer 30 is added to the above sum, with application of an activation function process as required, to obtain a value which is then newly stored in the element $C^r$ (p, q) of the array $C^1$. In this process, the calculation of sum of products with respect to i (i=1, 2) can be performed in parallel, which is advantageous in achieving the shortening of process time, that is, high-speed operation. Moreover, in these processes, the processes with respect to r (r=1, 2, 3) can be performed in parallel, which is advantageous in achieving the shortening of process time, that is, high-speed operation. As a result of the above process, the value stored in the element $C^r$ (p, q) of the array $C^r$ is the output of the process layer 30, having the depth of a value r, with respect to each group of p ($1 \leq p \leq 8$), q ($1 \leq q \leq 8$), and r ($1 \leq r \leq 3$).

(First Process of Process Layer 60)

Subsequently, with respect to i ($1 \leq i \leq 3$), j ($1 \leq j \leq 9$), and k, m ($1 \leq k, m \leq 3$), a numerical value of an element $F_j^i$ (k, m) of an array $F_j^i$ stored in the storage device 55 of the numerical-value storage unit 4 shown in FIG. 3 is read out by the reader 5 shown in FIG. 3 and stored in an element $V_j^i$ (k, m) of an array $V_j^i$ of the storage device 58.

Figure 19:
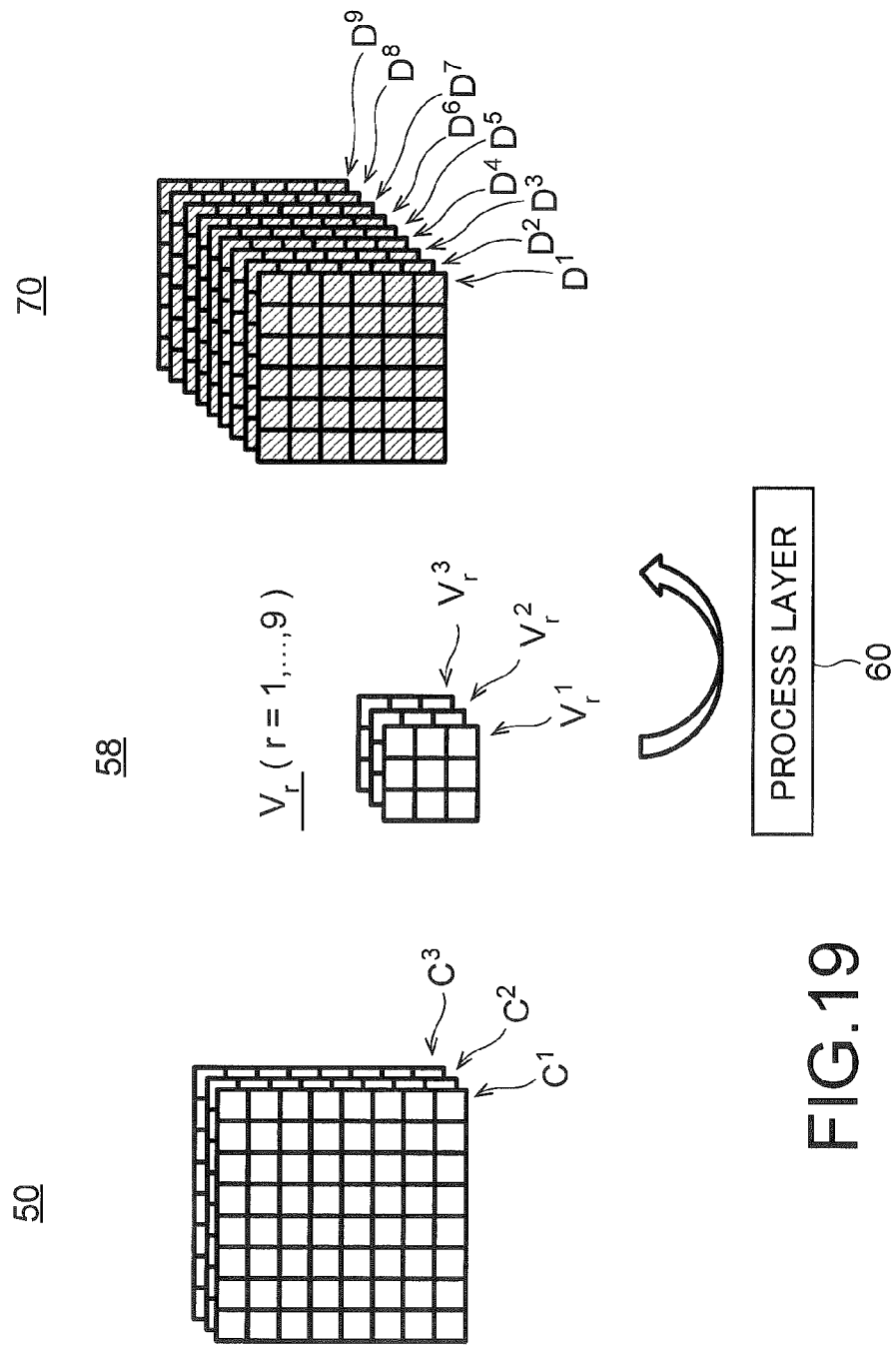
FIG. 19 is a diagram explaining a convolution process of another process layer in the second embodiment.

In the same way as described above with respect to FIGS. 9 to 11, the total sum of products of data $C^i$ (j+p−1, k+q−1) stored in the storage device 50 and data $V_r^i$ (j, k) stored in the storage device 58 is calculated over i ($1 \leq i \leq 3$), j ($1 \leq j \leq 3$), and k ($1 \leq k \leq 3$), with respect to each group of p ($1 \leq p \leq 6$), q ($1 \leq q \leq 6$), and r ($1 \leq r \leq 9$). The total sum is expressed as $\Sigma\Sigma\Sigma C^i$ (j+p−1, k+q−1)×$V_r^i$ (j, k). The first total-sum sign Σ means that the total sum is obtained with respect to i. The second total-sum sign Σ means that the total sum is obtained with respect to j. The third total-sum sign Σ means that the total sum is obtained with respect to k. Total sum obtained with respect to each group of p ($1 \leq p \leq 6$), q ($1 \leq q \leq 6$), and r ($1 \leq r \leq 9$) is stored in an element $D^r$ (p, q) of an array $D^r$ of the storage device 70. FIG. 19 shows the state where this process completes. In this process, the calculation of sum of products with respect to i (i=1, 2, 3) can be performed in parallel, which is advantageous in achieving the shortening of process time, that is, high-speed operation. Moreover, the processes to r (r=1, . . . , 9) can also be performed in parallel, which is advantageous in achieving the shortening of process time, that is, high-speed operation.

(Second Process of Process Layer 30)

Subsequently, with respect to i ($1 \leq i \leq 2$), j ($1 \leq j \leq 3$), and k, m ($1 \leq k, m \leq 4$), the processes the same as those explained with respect to FIGS. 13 to 18 are performed, except that an element $E_{j+3}^i$ (k, m) is used instead of the element $E_j^i$ (k, m) of the array $E_j^i$ in the process of reading out a numerical value stored in the element $E_j^i$ (k, m) of the array $E_j^i$. At the completion of these processes, the value stored in the element $C^r$ (p, q) of the array $C^r$ of the storage device 50 is the output of the process layer 30, having the depth of a value r+3, with respect to each group of p ($1 \leq p \leq 8$), q ($1 \leq q \leq 8$), and r ($1 \leq r \leq 3$).

(Second Process of Process Layer 60)

Subsequently, with respect to i ($1 \leq i \leq 3$), j ($1 \leq j \leq 9$), and k, m ($1 \leq k, m \leq 3$), a numerical value of an element $F_j^{i+3}$ (k, m) of an array $F_j^{i+3}$ stored in the storage device 55 of the numerical-value storage unit 4 shown in FIG. 3 is read out by the reader 5 shown in FIG. 3 and stored in the element $V_j^i$ (k, m) of the array $V_j^i$ of the storage device 58.

Succeedingly, in the same way as described above with respect to FIGS. 9 to 11, the total sum of products of data $C^i$ (j+p−1, k+q−1) stored in the storage device 50 and the data $V_r^i$ (j, k) stored in the storage device 58 is calculated over i ($1 \leq i \leq 3$), j ($1 \leq j \leq 3$), and k ($1 \leq k \leq 3$), with respect to each group of p ($1 \leq p \leq 6$), q ($1 \leq q \leq 6$), and r ($1 \leq r \leq 9$). The total sum is expressed as $\Sigma\Sigma\Sigma C^i$ (j+p−1, k+q−1)×$V_r^i$ (j, k). The first total-sum sign Σ means that the total sum is obtained with respect to i. The second total-sum sign Σ means that the total sum is obtained with respect to j. The third total-sum sign Σ means that the total sum is obtained with respect to k. A sum of the total sum obtained with respect to each group of p ($1 \leq p \leq 6$), q ($1 \leq q \leq 6$), and r ($1 \leq r \leq 9$), and the numerical value stored in the element $D^r$ (p, q) of the array $D^r$ of the storage device 70 is newly stored in the element $D^r$ (p, q). In this process, the calculation of sum of products with respect to i (i=1, 2, 3) can be performed in parallel, which is advantageous in achieving the shortening of process time, that is, high-speed operation. Moreover, the processes to r (r=1, . . . , 9) can also be performed in parallel, which is advantageous in achieving the shortening of process time, that is, high-speed operation.

(Third Process of Process Layer 30)

Subsequently, the processes the same as those explained with respect to FIGS. 13 to 18 are performed, except that an element $E_{j+6}^i$ (k, m) is used instead of the element $E_j^i$ (k, m) of the array $E_j^i$ stored in the storage device 35 in the process of reading out a numerical value of the element $E_j^i$ (k, m). At the completion of these processes, the value stored in the element $C^r$ (p, q) of the array $C^r$ of the storage device 50 is the output of the process layer 30, having the depth of a value r+6, with respect to each group of p ($1 \leq p \leq 8$), q ($1 \leq q \leq 8$), and r ($1 \leq r \leq 3$).

(Third Process of Process Layer 60)

Subsequently, with respect to i ($1 \leq i \leq 3$), j ($1 \leq j \leq 9$), and k, m ($1 \leq k, m \leq 3$), a numerical value of an element $F_j^{i+6}$ (k, m) of an array $F_j^{i+6}$ stored in the storage device 55 of the numerical-value storage unit 4 shown in FIG. 3 is read out by the reader 5 shown in FIG. 3 and stored in the element $V_j^i$ (k, m) of the array $V_j^i$ of the storage device 58.

Succeedingly, in the same way as described above with respect to FIGS. 9 to 11, the total sum of products of data $C^i$ (j+p−1, k+q−1) stored in the storage device 50 and the data $V_r^i$ (j, k) stored in the storage device 58 is calculated over i ($1 \leq i \leq 3$), j ($1 \leq j \leq 3$), and k ($1 \leq k \leq 3$), with respect to each group of p ($1 \leq p \leq 6$), q ($1 \leq q \leq 6$), and r ($1 \leq r \leq 9$). The total sum is expressed as $\Pi$-$C^i$ (j+p−1, k+q−1)×$V_r^i$ (j, k). The first total-sum sign Σ means that the total sum is obtained with respect to i. The second total-sum sign Σ means that the total sum is obtained with respect to j. The third total-sum sign Σ means that the total sum is obtained with respect to k. A sum of the total sum obtained with respect to each group of p ($1 \leq p \leq 6$), q ($1 \leq q \leq 6$), and r ($1 \leq r \leq 9$), and the numerical value stored in the element $D^r$ (p, q) of the array $D^r$ of the storage device 70 is newly stored in the element $D^r$ (p, q). In this process, the calculation of sum of products with respect to i (i=1, 2, 3) can be performed in parallel, which is advantageous in achieving the shortening of process time, that is, high-speed operation. Moreover, the processes to r (r=1, . . . , 9) can also be performed in parallel, which is advantageous in achieving the shortening of process time, that is, high-speed operation.

(Fourth Process of Process Layer 30)

Subsequently, with respect to $1 \leq i \leq 2$, $1 \leq j \leq 3$, and $1 \leq k$, $m \leq 4$, the processes the same as those explained with respect to FIGS. 13 to 18 are performed, except that an element $E_{j+9}^i$ (k, m) is used instead of the element $E_j^i$ (k, m) of the array $E_j^i$ in the process of reading out a numerical value stored the element $E_j^i$ (k, m). At the completion of these processes, the value stored in the element $C^r$(p, q) of the array $C^r$ of the storage device 50 is the output of the process layer 30, having the depth of a value r+9, with respect to each group of p ($1 \leq p \leq 8$), q ($1 \leq q \leq 8$), and r ($1 \leq r \leq 3$).

(Fourth Process of Process Layer 60)

Subsequently, with respect to i ($1 \leq i \leq 3$), j ($1 \leq j \leq 9$), and k, m ($1 \leq k, m \leq 3$), a numerical value of an element $F_j^{i+9}$ (k, m) of an array $F_j^{i+9}$ stored in the storage device 55 of the numerical-value storage unit 4 shown in FIG. 3 is read out by the reader 5 shown in FIG. 3 and stored in the element $V_j^i$ (k, m) of the array $V_j^i$ of the storage device 58.

Succeedingly, in the same way as described above with respect to FIGS. 9 to 11, the total sum of products of data $C^i$ (j+p−1, k+q−1) stored in the storage device 50 and the data $V_r^i$ (j, k) stored in the storage device 58 is calculated over i (1≤i≤3), j (1≤j≤3), and k (1≤k≤3), with respect to each group of p (1≤p≤6), q (1≤q≤6), and r (1≤r≤9). The total sum is expressed as $\Sigma\Sigma\Sigma C^i$ (j+p−1, k+q−1)×$V_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. Calculated next is a sum of the total sum obtained with respect to each group of p (1≤p≤6), q (1≤q≤6), and r (1≤r≤9), and the numerical value stored in the element $D^r$ (p, q) of the array $D^r$ of the storage device 70. In this process, the calculation of sum of products with respect to i (i=1, 2, 3) can be performed in parallel, which is advantageous in achieving the shortening of process time, that is, high-speed operation. Then, a bias value $B2^r$ of the process layer 60 is added to the above sum, with application of an activation function process as required, to obtain a value which is then newly stored in the element $D^r$ (p, q). Moreover, in these processes, the processes with respect to r (r=1, . . . , 9) can also be performed in parallel, which is advantageous in achieving the shortening of process time, that is, high-speed operation. As a result of the above process, the value stored in the element $D^r$ (p, q) of the array $D^r$ of the storage device 70 is the output of the process layer 60, having the depth of a value r, with respect to each group of p (1≤p≤6), q (1≤q≤6), and r (1≤r≤9).

In the present embodiment, since the depth of the kernel $W_i$ (i=1, 2) is 2, the storage device 40 has smaller capacity than that in the first embodiment. Therefore, the present embodiment is advantageous in further decrease in storage device.

On the contrary, the arithmetic processing device of the first embodiment is capable of parallel processing in the processes at the input side of the process layer 30 in the depth direction over the entire depths, which is advantageous in achieving the shortening of process time, that is, high-speed operation.

In the present embodiment, the depth of the kernel $W_i$ (i=1, 2) is 2, which is, however, not always necessary. Nevertheless, when the depth of the kernel $W_i$ (i=1, 2) is a divisor of the depth of the input of the process layer 30, that is, a divisor of the depth of the arrays of the storage device 20, there is an advantage of no waste being generated.

What is explained in the present embodiment is the convolution process only, without referring to a pooling process. However, since the pooling process is performed independently for each depth, even if the pooling process is performed following to the convolution process of the process layer 30 or the process layer 60, the same effects as described above can be obtained.

As explained above, according to the second embodiment, in the same manner as the first embodiment, it is achieved to provide an arithmetic processing device capable of reducing the capacity of storage devices. Since, the capacity of storage devices can be reduced, the circuit area can be made smaller to restrict the production cost.

Third Embodiment

Figure 20:
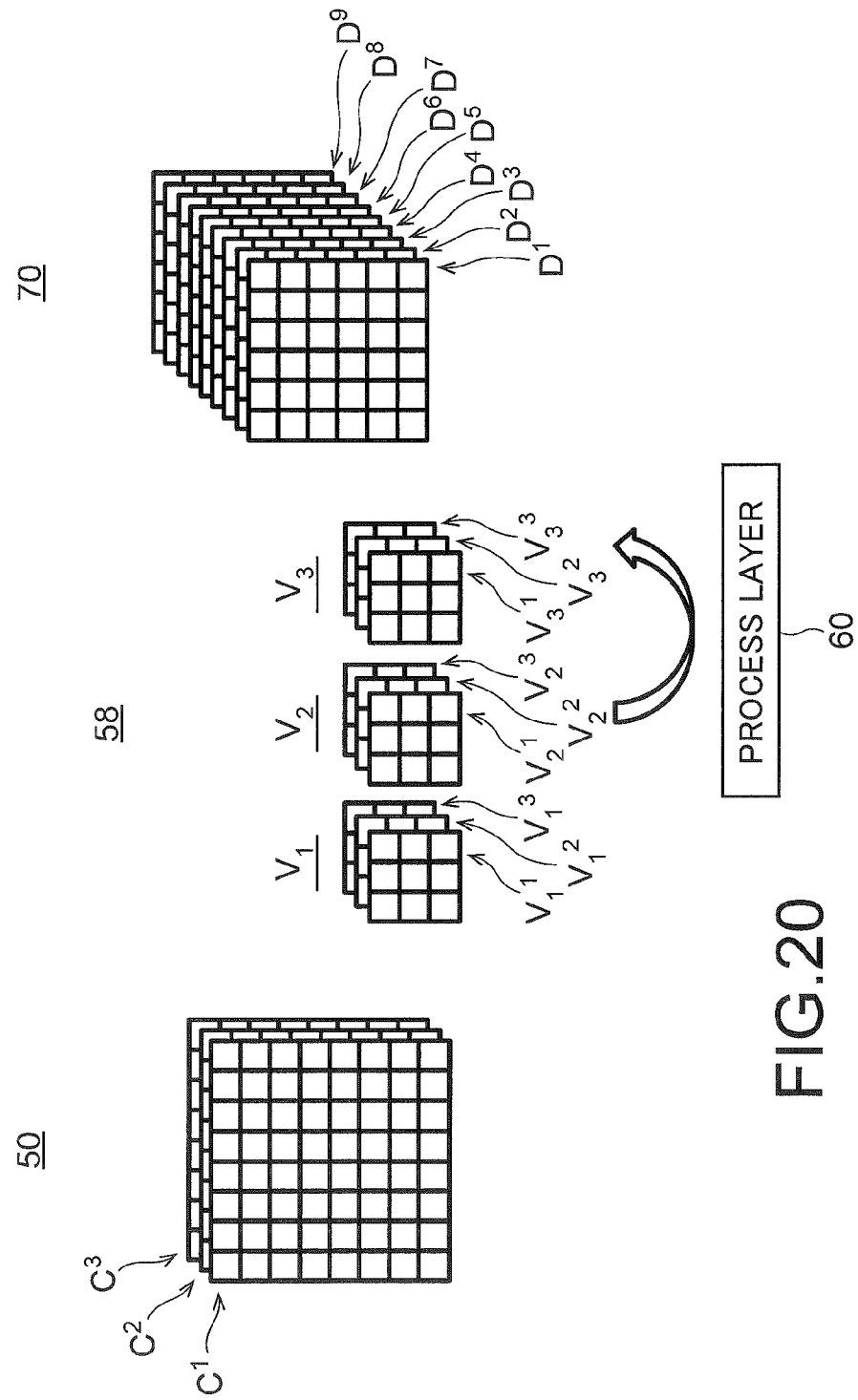
FIG. 20 is a diagram explaining the outline of an arithmetic processing device according to a third embodiment.

An arithmetic processing device 1 according to a third embodiment will be explained with reference to FIGS. 20 to 23. The arithmetic processing device 1 of the present embodiment is different, in the number of the kernels of the storage device 58, from the arithmetic processing device 1 of the first embodiment. In the first embodiment, the number of the kernels of the storage device 58 is equal to the depth of the output of the process layer 60, that is, the depth of the arrays of the storage device 70. In the third embodiment, as shown in FIG. 20, the number of kernels to be stored in the storage device 58 is 3. Each kernel V (i=1, 2, 3) to be stored in the storage device 58 has arrays $V_i^1$, $V_i^2$, and $V_i^3$ arranged in three rows and three columns.

Subsequently, an operation in the present embodiment will be explained.

(First Process of Process Layer 30)

First of all, with respect to i (1≤i≤8), j (1≤j≤3), and k, m (1≤k, m≤4), a numerical value of an element $E_j^i$ (k, m) of an array $E_j^i$ stored in the storage device 35 of the numerical-value storage unit 4 shown in FIG. 3 is read out by the reader 5 shown in FIG. 3 and stored in an element $W_j^i$ (k, m) of an array $W_j^i$ to be stored in the storage device 40.

Then, in the same manner as explained with reference to FIGS. 5 to 7, the total sum of products of data $A^i$ (j+p−1, k+q−1) stored in the storage device 20 and data $W_r^i$ (j, k) stored in the storage device 40 is calculated over i (1≤i≤8), j (1≤j≤4), and k (1≤k≤4), with respect to each group of p (1≤p≤8), q (1≤q≤8), and r (1≤r≤3). The total sum is expressed as $\Sigma\Sigma\Sigma A^i$ (j+p−1, k+q−1)×$W_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. This total sum is obtained with respect to each group of p (1≤p≤8), q (1≤q≤8), and r (1≤r≤3). In this process, the calculation of sum of products with respect to i (i=1, . . . , 8) can be performed in parallel, which is advantageous in achieving the shortening of process time, that is, high-speed operation. Then, a bias value $B1^r$ of the process layer 30 is added to the above total sum, with application of the activation function process as required, to obtain a value which is then stored in an element $C^r$ (p, q) of an array $C^r$ of the storage device 50. In these processes, the processes with respect to r (r=1, 2, 3) can be performed in parallel, which is advantageous in achieving the shortening of process time, that is, high-speed operation. As a result of the above process, the value stored in the element $C^r$ (p, q) of the array $C^r$ of the storage device 50 is the output of the process layer 30, having the depth of a value r, with respect to each group of p (1≤p≤8), q (1≤q≤8), and r (1≤r≤3).

(First Process of Process Layer 60)

Subsequently, with respect to i (1≤i≤3), j (1≤j≤3), and k, m (1≤k, m≤3), a numerical value of an element $F)^i$ (k, m) of an array $F_j^i$ stored in the storage device 55 of the numerical-value storage unit 4 shown in FIG. 3 is read out by the reader 5 shown in FIG. 3 and stored in an element $V_j^i$ (k, m) of an array $V_j^i$ of the storage device 58.

Figure 21:
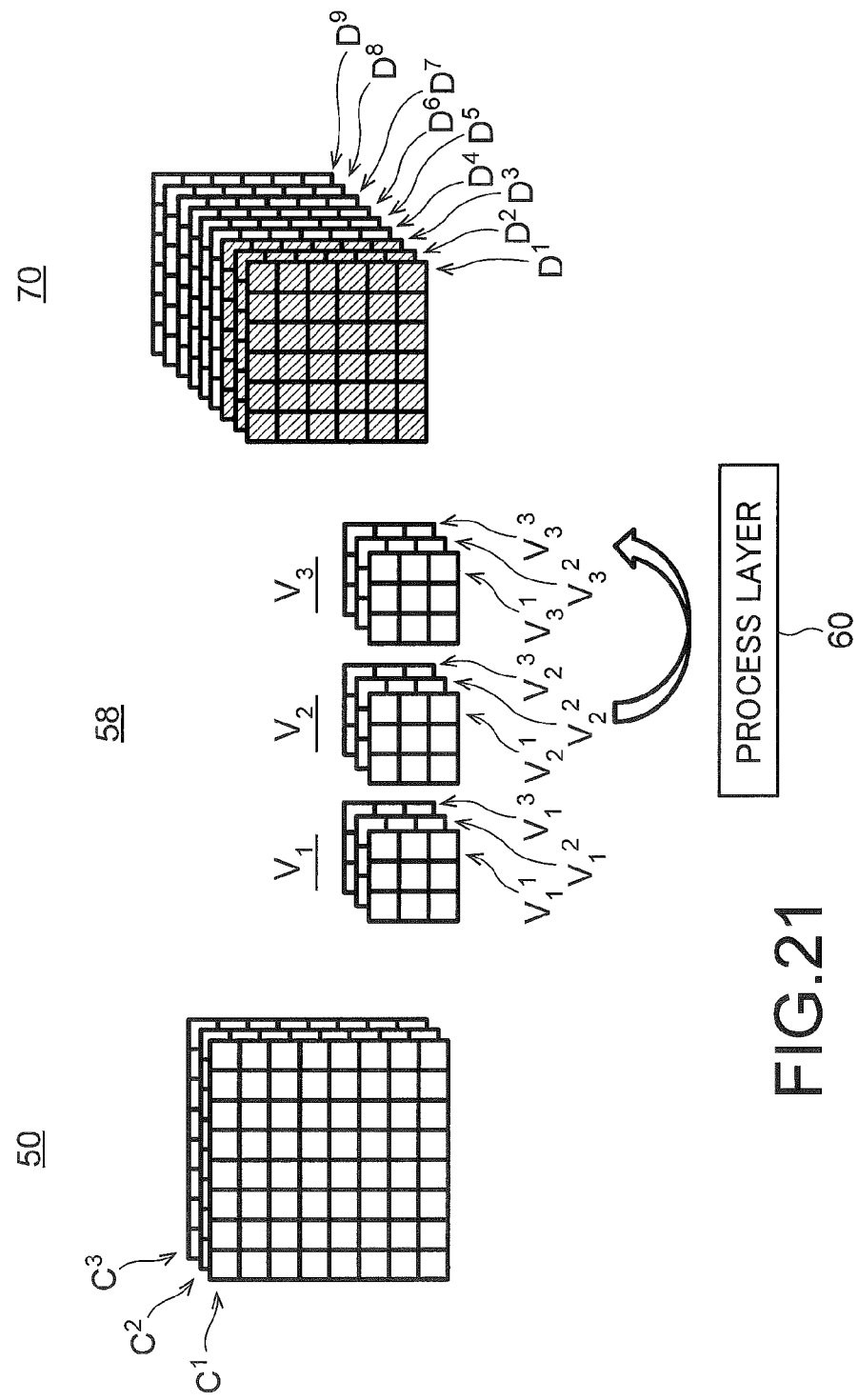
FIG. 21 is a diagram explaining a convolution process of a process layer in the third embodiment.

Subsequently, in the same manner as explained with reference to FIGS. 9 to 11, the total sum of products of data $C^i$ (j+p−1, k+q−1) stored in the storage device 50 and data $V_r^i$ (j, k) stored in the storage device 58 is calculated over i (1≤i≤3), j (1≤j≤3), and k (1≤k≤3), with respect to each group of p (1≤p≤6), q (1≤q≤6), and r (1≤r≤3). The total sum is expressed as $\Sigma\Sigma\Sigma C^i$ (j+p−1, k+q−1)×$V_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The total sum obtained with respect to each group of p (1≤p≤6), q (1≤q≤6), and r (1≤r≤3) is stored in an element $D^r$ (p, q) of an array $D^r$ of the storage device 70. FIG. 21 shows the state where this process completes. In this process, the calculation of sum of products with respect to i (i=1, 2, 3) can be performed in parallel, which is advantageous in achieving the shortening of process time, that is, high-speed operation. The processes with respect to r (r=1, 2, 3) can also be performed in parallel, which is advantageous in achieving the shortening of process time, that is, high-speed operation.

Subsequently, with respect to i ($1 \le i \le 3$), j ($1 \le j \le 3$), and k, m ($1 \le k, m \le 3$), a numerical value of an element $F_{j+3}{}^i$ (k, m) of an array $F_j+_3{}^i$ stored in the storage device 55 of the numerical-value storage unit 4 shown in FIG. 3 is read out by the reader 5 shown in FIG. 3 and stored in the element $V_j{}^i$ (k, m) of the array $V_j{}^i$ stored in the storage device 58.

Figure 22:
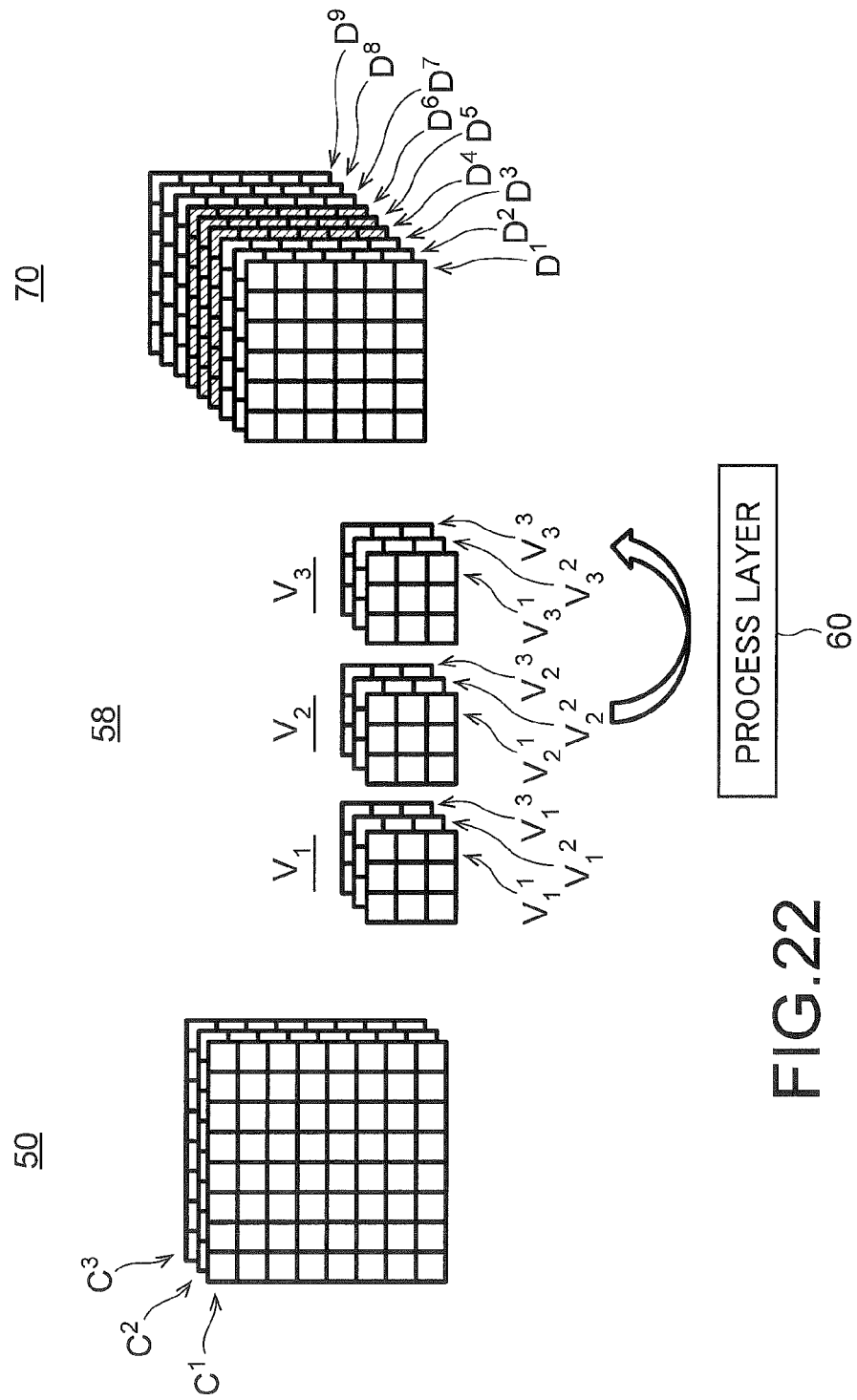
FIG. 22 is a diagram explaining a convolution process of the process layer in the third embodiment.

Subsequently, in the same manner as explained with reference to FIG. 21, the total sum of products of data $C^i$ (j+p−1, k+q−1) stored in the storage device 50 and data $V_r{}^i$ (j, k) stored in the storage device 58 is calculated over i ($1 \le i \le 3$), j ($1 \le j \le 3$), and k ($1 \le k \le 3$), with respect to each group of p ($1 \le p \le 6$), q ($1 \le q \le 6$), and r ($1 \le r \le 3$). The total sum is expressed as $\Sigma\Sigma\Sigma C^i$ (j+p−1, k+q−1)×$V_r{}^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The total sum calculated with respect to each group of p ($1 \le p \le 6$), q ($1 \le q \le 6$), and r ($1 \le r \le 3$) is stored in an element $D^{r+3}$ (p, q) of an array $D^{r+3}$ of the storage device 70. FIG. 22 shows the state where this process completes. In this process, the calculation of sum of products with respect to i (i=1, 2, 3) can be performed in parallel, which is advantageous in achieving the shortening of process time, that is, high-speed operation. Moreover, the processes with respect to r (r=1, 2, 3) can be performed in parallel, which is advantageous in achieving the shortening of process time, that is, high-speed operation.

Subsequently, with respect to i ($1 \le i \le 3$), j ($1 \le j \le 3$), and k, m ($1 \le k, m \le 3$), a numerical value of an element $F_{j+6}{}^i$ (k, m) of a kernel $F_{j+6}{}^i$ stored in the storage device 55 of the numerical-value storage unit 4 shown in FIG. 3 is read out by the reader 5 shown in FIG. 3 and stored in the element $V_j{}^i$ (k, m) of the array $V_j{}^i$ stored in the storage device 58.

Subsequently, in the same manner as explained with reference to FIG. 21, the total sum of products of data $C^i$ (j+p−1, k+q−1) stored in the storage device 50 and data $V_r{}^i$ (j, k) stored in the storage device 58 is calculated over i ($1 \le i \le 3$), j ($1 \le j \le 3$), and k ($1 \le k \le 3$), with respect to each group of p ($1 \le p \le 6$), q ($1 \le q \le 6$), and r ($1 \le r \le 3$). The total sum is expressed as I-$C^i$ (j+p−1, k+q−1)×$V_r{}^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. The value obtained with respect to each group of p ($1 \le p \le 6$), q ($1 \le q \le 6$), and r ($1 \le r \le 3$) is stored in an element $D^{r+6}$ (p, q) of an array $D^{r+6}$ of the storage device 70. FIG. 23 shows the state where this process completes. In this process, the calculation of sum of products with respect to i (i=1, 2, 3) can be performed in parallel, which is advantageous in achieving the shortening of process time, that is, high-speed operation. Moreover, the processes with respect to r (r=1, 2, 3) can also be performed in parallel, which is advantageous in the shortening of process time, that is, high-speed operation.

(Second Process of Process Layer 30)

Succeedingly, with respect to i ($1 \le i \le 8$), j ($1 \le j \le 3$), and k, m ($1 \le k, m \le 4$), a numerical value of an element $E_{j+3}{}^i$ (k, m) of an array $E_{j+3}{}^i$ stored in the storage device 35 of the numerical-value storage unit 4 shown in FIG. 3 is read out by the reader 5 shown in FIG. 3 and stored in the element $W_j{}^i$ (k, m) of the array $W_j{}^i$ of the storage device 40.

Then, in the same manner as explained with reference to FIGS. 5 to 7, the total sum of products of data $A^i$ (j+p−1, k+q−1) stored in the storage device 20 and data $W_r{}^i$ (j, k) stored in the storage device 40 is calculated over i ($1 \le i \le 8$), j ($1 \le j \le 4$), and k ($1 \le k \le 4$), with respect to each group of p ($1 \le p \le 8$), q ($1 \le q \le 8$), and r ($1 \le r \le 3$). The total sum is expressed as $\Sigma\Sigma\Sigma A^i$ (j+p−1, k+q−1)×$W_r{}^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. In this process, the calculation of sum of products with respect to i (i=1, . . . , 8) can be performed in parallel, which is advantageous in achieving the shortening of process time, that is, high-speed operation. Then, a bias value $B1^{r+3}$ of the process layer 30 is added to the value calculated with respect to each group of p ($1 \le p \le 8$), q ($1 \le q \le 8$), and r ($1 \le r \le 3$), with application of the activation function process as required, to obtain a value which is then stored in an element $C^r$(p, q) of the an array $C^r$ of the storage device 50. In these processes, the processes with respect to r (r=1, 2, 3) can be performed in parallel, which is advantageous in achieving the shortening of process time, that is, high-speed operation. As a result of the above process, the value stored in the element $C^r$(p, q) of the array $C^r$ of the storage device 50 is the output of the process layer 30, having the depth of a value r+3, with respect to each group of p ($1 \le p \le 8$), q ($1 \le q \le 8$), and r ($1 \le r \le 3$).

(Second Process of Process Layer 60)

Subsequently, with respect to i ($1 \le i \le 3$), j ($1 \le j \le 3$), and k, m ($1 \le k, m \le 3$), a numerical value of an element $F_j{}^{i+3}$ (k, m) of an array $F_j{}^{i+3}$ of the storage device 55 of the numerical-value storage unit 4 shown in FIG. 3 is read out by the reader 5 shown in FIG. 3 and stored in the element $V_j{}^i$ (k, m) of the array $V_j{}^i$ of the storage device 58.

Subsequently, in the same manner as explained with reference to FIG. 21, the total sum of products of data $C^i$ (j+p−1, k+q−1) stored in the storage device 50 and data $V_r{}^i$ (j, k) stored in the storage device 58 is calculated over i ($1 \le i \le 3$), j ($1 \le j \le 3$), and k ($1 \le k \le 3$), with respect to each group of p ($1 \le p \le 6$), q ($1 \le q \le 6$), and r ($1 \le r \le 3$). The total sum is expressed as $\Sigma\Sigma\Sigma C^i$ (j+p−1, k+q−1)×$V_r{}^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. A sum of the value obtained with respect to each group of p ($1 \le p \le 6$), q ($1 \le q \le 6$), and r ($1 \le r \le 3$), and the element $D^r$ (p, q) of the array $D^r$ of the storage device 70 is newly stored in the element $D^r$ (p, q). In this process, the calculation of sum of products with respect to i (i=1, 2, 3) can be performed in parallel, which is advantageous in achieving the shortening of process time, that is, high-speed operation. Moreover, the processes with respect to r (r=1, 2, 3) can also be performed in parallel, which is advantageous in achieving the shortening of process time, that is, high-speed operation.

Subsequently, with respect to i ($1 \le i \le 3$), j ($1 \le j \le 3$), and k, m ($1 \le k, m \le 3$), a numerical value of an element $F_{j+3}{}^{i+3}$ (k, m) of an array $F_j+_3{}'+^3$ of the storage device 55 of the numerical-value storage unit 4 shown in FIG. 3 is read out and stored in the element $V_j{}^i$ (k, m) of the array $V_j{}^i$ of the storage device 40.

Subsequently, in the same manner as explained with reference to FIG. 22, the total sum of products of data $C^i$ (j+p−1, k+q−1) stored in the storage device 50 and the element $V_r{}^i$ (j, k) of data $V_r{}^i$ (j, k) stored in the storage device 58 is calculated over i (1≤i≤3), j (1≤j≤3), and k (1≤k≤3), with respect to each group of p (1≤p≤6), q (1≤q≤6), and r (1≤r≤3). The total sum is expressed as ΣΣΣC$^i$ (j+p−1, k+q−1)×V$_r^i$ (j, k). The first total-sum sign Σ means that the total sum is obtained with respect to i. The second total-sum sign Σ means that the total sum is obtained with respect to j. The third total-sum sign Σ means that the total sum is obtained with respect to k. A sum of the value obtained with respect to each group of p (1≤p≤6), q (1≤q≤6), and r (1≤r≤3), and the element D$'^{r+3}$ (p, q) of the array D$^r$ of the storage device 70 is newly stored in the element D$'^{r+3}$ (p, q). In this process, the calculation of sum of products with respect to i (i=1, 2, 3) can be performed in parallel, which is advantageous in achieving the shortening of process time, that is, high-speed operation. Moreover, the processes with respect to r (r=1, 2, 3) can also be performed in parallel, which is advantageous in achieving the shortening of process time, that is, high-speed operation.

Subsequently, with respect to i (1≤i≤3), j (1≤j≤3), and k, m (1≤k, m≤3), a numerical value of an element F$_{j+6}^{i+3}$ (k, m) of an array F$_{j+6}^{i+3}$ of the storage device 55 of the numerical-value storage unit 4 shown in FIG. 3 is read out by the reader 5 shown in FIG. 3 and stored in the element V$_j^i$ (k, m) of the array V$_j^i$ of the storage device 40.

Subsequently, in the same manner as explained with reference to FIG. 23, the total sum of products of data C$^i$ (j+p−1, k+q−1) stored in the storage device 50 and data V$_r^i$ (j, k) stored in the storage device 58 is calculated over i (1≤i≤3), j (1≤j≤3), and k (1≤k≤3), with respect to each group of p (1≤p≤6), q (1≤q≤6), and r (1≤r≤3). The total sum is expressed as ΣΣΣC$^i$ (j+p−1, k+q−1)×V$_r^i$ (j, k). The first total-sum sign Σ means that the total sum is obtained with respect to i. The second total-sum sign Σ means that the total sum is obtained with respect to j. The third total-sum sign Σ means that the total sum is obtained with respect to k. A sum of the value obtained with respect to each group of p (1≤p≤6), q (1≤q≤6), and r (1≤r≤3) and the element D$'^{r+6}$ (p, q) of the array D$^r$ of the storage device 70 is newly stored in the element D$'^{r+6}$ (p, q). In this process, the calculation of sum of products with respect to i (i=1, 2, 3) can be performed in parallel, which is advantageous in achieving the shortening of process time, that is, high-speed operation. Moreover, the processes with respect to r (r=1, 2, 3) can also be performed in parallel, which is advantageous in achieving the shortening of process time, that is, high-speed operation.

(Third Process of Process Layer 30)

Succeedingly, with respect to i (1≤i≤8), j (1≤j≤3), and k, m (1≤k, m≤4), a numerical value of an element E$_{j+6}^i$ (k, m) of an array E$_{j+6}^i$ of the storage device 35 of the numerical-value storage unit 4 shown in FIG. 3 is read out by the reader 5 shown in FIG. 3 and stored in the element W$_j^i$ (k, m) of the array W$_j^i$ of the storage device 40.

Then, in the same manner as explained with reference to FIGS. 5 to 7, the total sum of products of data A$^i$ (j+p−1, k+q−1) stored in the storage device 20 and data W$_r^i$ (j, k) stored in the storage device 40 is calculated over i (1≤i≤8), j (1≤j≤4), and k (1≤k≤4), with respect to each group of p (1≤p≤8), q (1≤q≤8), and r (1≤r≤3). The total sum is expressed as ΙΣΣΣA$^i$ (j+p−1, k+q−1)×W$_r^i$ (j, k). The first total-sum sign Σ means that the total sum is obtained with respect to i. The second total-sum sign Σ means that the total sum is obtained with respect to j. The third total-sum sign Σ means that the total sum is obtained with respect to k. In this process, the calculation of sum of products with respect to i (i=1, . . . , 8) can be performed in parallel, which is advantageous in achieving the shortening of process time, that is, high-speed operation. Then, a bias value B1$'^{r+6}$ of the process layer 30 is added to the value calculated with respect to each group of p (1≤p≤8), q (1≤q≤8), and r (1≤r≤3), with application of the activation function process as required, to obtain a value which is then stored in an element C$^r$(p, q) of the an array C$^r$ of the storage device 50. In these processes, the processes with respect to r (r=1, 2, 3) can be performed in parallel, which is advantageous in achieving the shortening of process time, that is, high-speed operation. As a result of the above process, the value stored in the element C$^r$(p, q) of the array C$^r$ of the storage device 50 is the output of the process layer 30, having the depth of a value r+6, with respect to each group of p (1≤p≤8), q (1≤q≤8), and r (1≤r≤3).

(Third Process of Process Layer 60)

Subsequently, with respect to i (1≤i≤3), j (1≤i≤3), and k, m (1≤k, m≤3), a numerical value of an element F$_j^{i+6}$ (k, m) of an array F$_j^{i+6}$ of the storage device 55 of the numerical-value storage unit 4 shown in FIG. 3 is read out by the reader 5 shown in FIG. 3 and stored in the element V$_j^i$ (k, m) of the array V$_j^i$ of the storage device 58.

Subsequently, in the same manner as explained with reference to FIG. 21, the total sum of products of data C$^i$ (j+p−1, k+q−1) stored in the storage device 50 and data V$_r^i$ (j, k) stored in the storage device 58 is calculated over i (1≤i≤3), j (1≤j≤3), and k (1≤k≤3), with respect to each group of p (1≤p≤6), q (1≤q≤6), and r (1≤r≤3). The total sum is expressed as ΣΣΣC$^i$ (j+p−1, k+q−1)×V$_r^i$ (j, k). The first total-sum sign Σ means that the total sum is obtained with respect to i. The second total-sum sign Σ means that the total sum is obtained with respect to j. The third total-sum sign Σ means that the total sum is obtained with respect to k. A sum of the value obtained with respect to each group of p (1≤p≤6), q (1≤q≤6), and r (1≤r≤3), and an element D$^r$ (p, q) of an array D$^r$ of the storage device 70 is newly stored in the element D$^r$ (p, q). In this process, the calculation of sum of products with respect to i (i=1, 2, 3) can be performed in parallel, which is advantageous in achieving the shortening of process time, that is, high-speed operation. Moreover, the processes with respect to r (r=1, 2, 3) can also be performed in parallel, which is advantageous in achieving the shortening of process time, that is, high-speed operation.

Subsequently, with respect to i (1≤i≤3), j (1≤j≤3), and k, m (1≤k, m≤3), a numerical value of an element F$_{j+3}^{i+6}$ (k, m) of an array F$_{j+3}^{i+6}$ stored in the storage device 55 of the numerical-value storage unit 4 shown in FIG. 3 is read out by the reader 5 shown in FIG. 3 and stored in the element V$_j^i$ (k, m) of the array V$_j^i$ of the storage device 58.

Subsequently, in the same manner as explained with reference to FIG. 22, the total sum of products of data C$^i$ (j+p−1, k+q−1) stored in the storage device 50 and data V$_r^i$ (j, k) stored in the storage device 58 is calculated over i (1≤i≤3), j (1≤j≤3), and k (1≤k≤3), with respect to each group of p (1≤p≤56), q (1≤q≤6), and r (1≤r≤3). The total sum is expressed as ΣΣΣC$^i$ (j+p−1, k+q−1)×V$_r^i$ (j, k). The first total-sum sign Σ means that the total sum is obtained with respect to i. The second total-sum sign Σ means that the total sum is obtained with respect to j. The third total-sum sign Σ means that the total sum is obtained with respect to k. A sum of the value obtained with respect to each group of p (1≤p≤6), q (1≤q≤6), and r (1≤r≤3), and an element D$'^{r+3}$ (p, q) of the array D$^r$ of the storage device 70 is newly stored in the element D$'^{r+3}$ (p, q). In this process, the calculation of sum of products with respect to i (i=1, 2, 3) can be performed in parallel, which is advantageous in achieving the shortening of process time, that is, high-speed operation. Moreover, the processes with respect to r (r=1, 2, 3) can also be performed in parallel, which is advantageous in achieving the shortening of process time, that is, high-speed operation.

Subsequently, with respect to i (1≤i≤3), j (1≤j≤3), and k, m (1≤k, m≤3), a numerical value of an element $F_{j+6}'^{+6}$ (k, m) of an array $F_{j+6}^{i+6}$ of the storage device 55 of the numerical-value storage unit 4 shown in FIG. 3 is read out by the reader 5 shown in FIG. 3 and stored in an element $V_j^i$ (k, m) of an array $V_{j+6}^{i+6}$ of the storage device 58.

Subsequently, in the same manner as explained with reference to FIG. 23, the total sum of products of data $C^i$ (j+p−1, k+q−1) stored in the storage device 50 and data $V_r^i$ (j, k) stored in the storage device 58 is calculated over i (1≤i≤3), j (1≤j≤3), and k (1≤k≤3), with respect to each group of p (1≤p≤6), q (1≤q≤6), and r (1≤r≤3). The total sum is expressed as $\Sigma\Sigma\Sigma C^i$ (j+p−1, k+q−1)×$V_r^i$ (j, k). The first total-sum sign Σ means that the total sum is obtained with respect to i. The second total-sum sign Σ means that the total sum is obtained with respect to j. The third total-sum sign Σ means that the total sum is obtained with respect to k. A sum of the value obtained with respect to each group of p (1≤p≤6), q (1≤q≤6), and r (1≤r≤3), and an element $D^{r+6}$ (p, q) of the array $D^r$ of the storage device 70 is newly stored in the element $D^{r+6}$ (p, q). In this process, the calculation of sum of products with respect to i (i=1, 2, 3) can also be performed in parallel, which is advantageous in achieving the shortening of process time, that is, high-speed operation. Moreover, the processes with respect to r (r=1, 2, 3) can be performed in parallel, which is advantageous in achieving the shortening of process time, that is, high-speed operation.

(Fourth Process of Process Layer 30)

Subsequently, with respect to i (1≤i≤8), j (1≤j≤3), and k, m (1≤k, m≤4), a numerical value of an element $E_{j+9}^i$ (k, m) of an array $E_{j+9}^i$ of the storage device 35 of the numerical-value storage unit 4 shown in FIG. 3 is read out by the reader 5 shown in FIG. 3 and stored in the element $W_j^i$ (k, m) of the array $W_j^i$ of the storage device 40.

Then, in the same manner as explained with reference to FIGS. 5 to 7, the total sum of products of data $A^i$ (j+p−1, k+q−1) stored in the storage device 20 and data $W_r^i$ (j, k) stored in the storage device 40 is calculated over i (1≤i≤8), j (1≤j≤4), and k (1≤k≤4), with respect to each group of p (1≤p≤8), q (1≤q≤8), and r (1≤r≤3). The total sum is expressed as $\Sigma\Sigma\Sigma A'$ (j+p−1, k+q−1)×$W_r^i$ (j, k). The first total-sum sign Σ means that the total sum is obtained with respect to i. The second total-sum sign Σ means that the total sum is obtained with respect to j. The third total-sum sign Σ means that the total sum is obtained with respect to k. In this process, the calculation of sum of products with respect to i (i=1, . . . , 8) can be performed in parallel, which is advantageous in achieving the shortening of process time, that is, high-speed operation. Then, a bias value $B1^{r+9}$ of the process layer 30 is added to the value calculated with respect to each group of p (1≤p≤8), q (1≤q≤8), and r (1≤r≤3), with application of the activation function process as required, to obtain a value which is then stored in the element $C^r$ (p, q) of the array $C^r$ of the storage device 50. In these processes, the processes with respect to r (r=1, 2, 3) can be performed in parallel, which is advantageous in achieving the shortening of process time, that is, high-speed operation. As a result of the above process, the value stored in the element $C^r$(p, q) of the array $C^r$ of the storage device 50 is the output of the process layer 30, having the depth of a value r+9, with respect to each group of p (1≤p≤8), q (1≤q≤8), and r (1≤r≤3).

(Fourth Process of Process Layer 60)

Subsequently, with respect to i (1≤i≤3), j (1≤j≤3), and k, m (1≤k, m≤3), a numerical value of an element $F_j^{i+9}$ (k, m) of an array $F_j^{i+9}$ stored in the storage device 55 of the numerical-value storage unit 4 shown in FIG. 3 is read out by the reader 5 shown in FIG. 3 and stored in the element $V_j^i$ (k, m) of the array $V_j^i$ of the storage device 58.

Subsequently, in the same manner as explained with reference to FIG. 21, the total sum of products of data $C^i$ (j+p−1, k+q−1) stored in the storage device 50 and data $V_r^i$ (j, k) stored in the storage device 58 is calculated over i (1≤i≤3), j (1≤j≤3), and k (1≤k≤3), with respect to each group of p (1≤p≤6), q (1≤q≤6), and r (1≤r≤3). The total sum is expressed as $\Sigma\Sigma\Sigma C^i$ (j+p−1, k+q−1)×$V_r^i$ (j, k). The first total-sum sign Σ means that the total sum is obtained with respect to i. The second total-sum sign Σ means that the total sum is obtained with respect to j. The third total-sum sign Σ means that the total sum is obtained with respect to k. A sum of the value obtained with respect to each group of p (1≤p≤6), q (1≤q≤6), and r (1≤r≤3), and an element $D^r$ (p, q) of the array $D^r$ of the storage device 70 is calculated. Then, a bias value $B2^r$ of the process layer 60 is added to the above sum, with application of an activation function process as required, to obtain a value which is then newly stored in the element $D^r$ (p, q). In this process, the calculation of sum of products with respect to i (i=1, 2, 3) can be performed in parallel, which is advantageous in achieving the shortening of process time, that is, high-speed operation. Moreover, in these processes, the processes with respect to r (r=1, 2, 3) can also be performed in parallel, which is advantageous in achieving the shortening of process time, that is, high-speed operation.

Subsequently, with respect to i (1≤i≤3), j (1≤j≤3), and k, m (1≤k, m≤3), a numerical value of an element $F_{j+3}^{i+9}$ (k, m) of an array $F_{j+3}^{i+9}$ stored in the storage device 55 of the numerical-value storage unit 4 shown in FIG. 3 is read out by the reader 5 shown in FIG. 3 and stored in the element $V_j^i$ (k, m) of the array $V_j^i$ of the storage device 40.

Subsequently, in the same way as described above with respect to FIG. 22, the total sum of products of data $C^i$ (j+p−1, k+q−1) stored in the storage device 50 and data $V_r^i$ (j, k) is calculated over i (1≤i≤3), j (1≤j≤3), and k (1≤k≤3), with respect to each group of p (1≤p≤6), q (1≤q≤6), and r (1≤r≤3). The total sum is expressed as $\Sigma\Sigma\Sigma C^i$ (j+p−1, k+q−1)×$V_r^i$ (j, k). The first total-sum sign Σ means that the total sum is obtained with respect to i. The second total-sum sign Σ means that the total sum is obtained with respect to j. The third total-sum sign Σ means that the total sum is obtained with respect to k. A sum of the value obtained with respect to each group of p (1≤p≤6), q (1≤q≤6), and r (1≤r≤3), and an element $D^{r+3}$ (p, q) of the array $D^r$ stored in the storage device 70 is calculated. Thereafter, a bias value $B2^{r+3}$ of the process layer 60 is added to the above sum, with application of an activation function process as required, to obtain a value which is then newly stored in the element $D^{r+3}$ (p, q). In this process, the calculation of sum of products with respect to i (i=1, 2, 3) can also be performed in parallel, which is advantageous in achieving the shortening of process time, that is, high-speed operation. Moreover, the processes with respect to r (r=1, 2, 3) can be performed in parallel, which is advantageous in achieving the shortening of process time, that is, high-speed operation.

Subsequently, with respect to i (1≤i≤3), j (1≤j≤3), and k, m (1≤k, m≤3), a numerical value of an element $F_{j+6}^{i+9}$ (k, m) of an array $F_{j+6}^{i+9}$ stored in the storage device 55 of the numerical-value storage unit 4 shown in FIG. 3 is read out by the reader 5 shown in FIG. 3 and stored in the element $V_j^i$ (k, m) of the array $V_j^i$ of the storage device 58.

Subsequently, in the same way as described above with respect to FIG. 23, the total sum of products of data $C^i$ (j+p−1, k+q−1) stored in the storage device 50 and data $V_r^i$ (j, k) stored in the storage device 58 is calculated over i ($1 \leq i \leq 3$), j ($1 \leq j \leq 3$), and k ($1 \leq k \leq 3$), with respect to each group of p ($1 \leq p \leq 6$), q ($1 \leq q \leq 6$), and r ($1 \leq r \leq 3$). The total sum is expressed as $\Sigma\Sigma\Sigma C^i$ (j+p−1, k+q−1)×$V_r^i$ (j, k). The first total-sum sign $\Sigma$ means that the total sum is obtained with respect to i. The second total-sum sign $\Sigma$ means that the total sum is obtained with respect to j. The third total-sum sign $\Sigma$ means that the total sum is obtained with respect to k. A sum of the value obtained with respect to each group of p ($1 \leq p \leq 6$), q ($1 \leq q \leq 6$), and r ($1 \leq r \leq 3$), and an element $D^{r+6}$ (p, q) of the array $D^r$ of the storage device 70 is calculated. Thereafter, a bias value $B2^{r+6}$ of the process layer 60 is added to the above sum, with application of an activation function process as required, to obtain a value which is then newly stored in the element $D^{r+6}$ (p, q). In this process, the calculation of sum of products with respect to i (i=1, 2, 3) can be performed in parallel, which is advantageous in achieving the shortening of process time, that is, high-speed operation. Moreover, the processes with respect to r (r=1, 2, 3) can also be performed in parallel, which is advantageous in achieving the shortening of process time, that is, high-speed operation. As a result of the above process, the value stored in the element $D^r$ (p, q) of the array $D^r$ is the output of the process layer 60, having the depth of a value r, with respect to each group of p ($1 \leq p \leq 6$), q ($1 \leq q \leq 6$), and r ($1 \leq r \leq 9$).

In the present embodiment, since the number of the kernels of the storage device 58 is 3, the storage device 58 has smaller capacity than that in the first embodiment. Therefore, the present embodiment is advantageous in further decrease in storage device. By contrast, the arithmetic processing device of the first embodiment is capable of parallel processing in the processes in the output side of the process layer 60 in the depth direction over the entire depths, which is advantageous in achieving the shortening of process time, that is, high-speed operation.

In the present embodiment, the number of the kernels of the storage device 58 is 3, which is, however, not always necessary. Nevertheless, it is preferable that, when the number of the kernels of the storage device 58 is a divisor of the depth of the output of the process layer 60, that is, a divisor of the depth of the arrays of the storage device 70, no waste is generated which is advantageous.

What is explained in the present embodiment is the convolution process only, without referring to a pooling process. However, since the pooling process is performed independently for each depth, even if the pooling process is performed following to the convolution process of the process layer 30 or the process layer 60, the same effects as described above can be obtained.

In the present embodiment, the depth of the kernels of the storage device 40 is 8, which is, however, not always necessary. Even if the depth of the kernels of the storage device 40 is 2, the processes of the process layers 30 and 60 can be performed by combining the processes of the present embodiment and the processes explained in the second embodiment. If the depth of the kernels of the storage device 40 is set to 2, the storage device 40 has smaller capacity than that in the present embodiment, and hence the storage device 58 has smaller capacity than that in the present embodiment, which is therefore advantageous in further decrease in storage device. By contrast, the present embodiment or the second embodiment are capable of parallel processing in the processes in the input of the process layer 30 or in the output of the process layer 60 in the entire depth direction, which is advantageous in achieving the shortening of process time, that is, high-speed operation.

As explained above, according to the third embodiment, in the same manner as the first embodiment, it is achieved to provide an arithmetic processing device capable of reducing capacity of storage devices. Since, the capacity of storage devices can be reduced, the circuit area can be made smaller to restrict the production cost.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An arithmetic processing device, comprising:
   a first storage device including m (m≥2) groups each including at least one first array having memory elements arranged in a first direction and a second direction intersecting with the first direction;
   a second storage device including n (m>n≥1) groups each including at least one second array having memory elements arranged in the first and second directions;
   a third storage device including at least one third array having memory elements arranged in the first and second directions;
   a fourth storage device including k (m>k≥1) fourth arrays each having memory elements arranged in the first and second directions; and
   a processor configured to
       select n groups of the first array from among the m groups of the first array of the first storage device,
       read out data stored in the memory elements of the first array included in the selected groups,
       store the read-out data in the memory elements of the second array of the second storage device,
       perform a convolution process on data stored in the memory elements of the third array of the third storage device with the data stored in the memory elements of the second array of the second storage device, and
       store a result of the convolution process in the fourth arrays of the fourth storage device.

2. The arithmetic processing device according to claim 1, wherein n is equal to or smaller than k.

3. The arithmetic processing device according to claim 1, wherein the number of the second array in each group of the second storage device is equal or smaller than the number of the first array in each group of the first storage device.

4. The arithmetic processing device according to claim 1, wherein the number of the memory elements of the second array arranged in the respective first and second directions are equal to the number of the memory elements of the first array arranged in the respective first and second directions.

5. The arithmetic processing device according to claim 1, further comprising:
   a fifth storage device including p (p≥2) groups each including at least one fifth array having memory elements arranged in the first and second directions;
   a sixth storage device including q (p>q≥1) groups each including at least one sixth array having memory elements arranged in the first and second directions; and a seventh storage device including r (p>r≥1) seventh arrays each having memory elements arranged in the first and second directions, wherein the processor is further configured to select q groups of the fifth array from among the p groups of the fifth array of the fifth storage device, read out data stored in the memory elements of the fifth array included in the selected groups, store the read-out data in the memory elements of the sixth array of the sixth storage device, perform a convolution process on data stored in memory elements of the fourth arrays of the fourth storage device with the data stored in the memory elements of the sixth array of the sixth storage device, and store a result of the convolution process in the seventh arrays of the seventh storage device, and wherein the number of the sixth array of each group of the sixth storage device is smaller than the number of the first array of each group of the first storage device.

6. The arithmetic processing device according to claim 5, wherein q is equal to or smaller than r.

7. The arithmetic processing device according to claim 5, wherein the number of each group of the sixth storage device is equal to or smaller than the number of the fourth array of the fourth storage device.

8. The arithmetic processing device according to claim 5, wherein the number of memory elements of the six array arranged in the respective first and second directions is equal to the number of the memory elements of the fifth array arranged in the respective first and second directions.

9. The arithmetic processing device according to claim 7, wherein the number of the groups of the second array in the second storage device, the number of the fourth arrays of the fourth storage device, and the number of the sixth array of each group of the sixth storage device are equal to one another.

10. The arithmetic processing device according to claim 1, wherein the number of the groups of the second array in the second storage device is equal to a divisor of the number of the groups of the first array in the first storage device.

* * * * *